United States Patent
Aschwanden et al.

(10) Patent No.: US 11,579,435 B2
(45) Date of Patent: Feb. 14, 2023

(54) OPTICAL DEVICE, PARTICULARLY CAMERA, PARTICULARLY COMPRISING AUTOFOCUS AND OPTICAL IMAGE STABILIZATION

(71) Applicant: OPTOTUNE CONSUMER AG, Dietikon (CH)

(72) Inventors: Manuel Aschwanden, Allenwinden (CH); Michael Bueeler, Vogelsang (CH); David Niederer, Küttigen (CH); Chris Laning, Windisch (CH); Roman Patscheider, Winterthur (CH)

(73) Assignee: OPTOTUNE CONSUMER AG, Dietikon (CH)

( * ) Notice: Subject to any disclaimer, the term of this patent is extended or adjusted under 35 U.S.C. 154(b) by 314 days.

(21) Appl. No.: 16/625,796

(22) PCT Filed: Jun. 22, 2018

(86) PCT No.: PCT/EP2018/066833
§ 371 (c)(1),
(2) Date: Dec. 23, 2019

(87) PCT Pub. No.: WO2018/234573
PCT Pub. Date: Dec. 27, 2018

(65) Prior Publication Data
US 2020/0124839 A1    Apr. 23, 2020

(30) Foreign Application Priority Data

Jun. 23, 2017   (EP) ..................................... 17177725

(51) Int. Cl.
*G02B 26/00*     (2006.01)
*G02B 27/64*     (2006.01)
(Continued)

(52) U.S. Cl.
CPC ............. *G02B 26/004* (2013.01); *G02B 3/14* (2013.01); *G02B 7/09* (2013.01); *G02B 27/646* (2013.01);
(Continued)

(58) Field of Classification Search
CPC .................. G02B 26/004; G02B 26/08; G02B 26/0875; G02B 3/12; G02B 3/14; G02B 7/09;
(Continued)

(56) References Cited

U.S. PATENT DOCUMENTS

| 2010/0232161 A1* | 9/2010 | Aschwanden ........... G02B 7/04 362/278 |
| 2016/0259094 A1 | 9/2016 | Aschwanden et al. |
| 2017/0082827 A1* | 3/2017 | Park ................... H04N 5/23212 |

FOREIGN PATENT DOCUMENTS

| JP | 2011253586 | 12/2011 |
| WO | 2008076399 | 6/2008 |

\* cited by examiner

*Primary Examiner* — Marin Pichler
(74) *Attorney, Agent, or Firm* — JMB Davis Ben-David

(57) ABSTRACT

The present invention relates to an optical device (1), comprising: a container (2) forming a fluidic lens, the container (2) comprising a transparent and elastically expandable membrane (10), a transparent optical element (20) facing the membrane (10), and a wall member (3), wherein the optical element (20) and the membrane (10) are connected to the wall member, and wherein said container encloses a volume (V) that is filled with a fluid (F), a lens shaping part (11) that is in contact with said membrane (10) for defining a curvature adjustable area (10c) of the membrane (10), which area (10c) faces said optical element (20), and a circumferential lens barrel (50) extending in an axial direction, which lens barrel (50) surrounds an opening (50c) in which at least one rigid lens (51) is arranged that is held (Continued)

by the lens barrel (50), and a voice coil motor (5) that is designed to move the lens shaping part (11) along an axial direction (z) with respect to said container (2), so as to adjust a curvature of said area (10*c*) and therewith a focal length of the fluidic lens, wherein the voice coil motor (5) comprises at least one coil (30, 31) arranged on a movable part (6) and a plurality of magnetic structures (40, 41) arranged on a motor holder (7), wherein said movable part (6) is movably mounted to the motor holder (7) via a spring structure (8) so that it can be moved along said axial direction (z), and wherein the lens shaping part (11) is mounted to said movable part (6).

17 Claims, 20 Drawing Sheets

(51) Int. Cl.
  *G02B 3/14* (2006.01)
  *G02B 7/09* (2021.01)
  *G03B 5/00* (2021.01)
  *G03B 13/36* (2021.01)
  *G02B 1/11* (2015.01)
  *H02K 41/035* (2006.01)

(52) U.S. Cl.
  CPC ............... *G03B 5/00* (2013.01); *G03B 13/36* (2013.01); *G02B 1/11* (2013.01); *G03B 2205/0007* (2013.01); *G03B 2205/0069* (2013.01); *H02K 41/0354* (2013.01)

(58) Field of Classification Search
  CPC ...... G02B 7/023; G02B 27/64; G02B 27/646; G02B 1/11; G03B 5/00; G03B 13/36; G03B 2205/00; G03B 2205/0007; G03B 2205/0015; G03B 2205/0023; G03B 2205/0069; H02K 41/0354
  USPC ................................ 359/554, 557, 228, 665
  See application file for complete search history.

OPTICAL DEVICE, PARTICULARLY CAMERA, PARTICULARLY COMPRISING AUTOFOCUS AND OPTICAL IMAGE STABILIZATION

CROSS-REFERENCE TO RELATED APPLICATIONS

This is the U.S. National Stage of International Patent Application No. PCT/EP2018/066833 filed on Jun. 22, 2018, which in turn claims the benefit of European Patent Application No. 17177725.3 filed on Jun. 23, 2017.

The invention relates to an optical device according to the preamble of claim 1.

An optical device of the afore-mentioned kind usually comprises a transparent and elastically expandable membrane, an optical element opposing or facing the membrane, a wall member, wherein the optical element and the membrane are connected to the wall member such that a container having a volume is formed, wherein at least the membrane, the optical element, and said wall member delimit said volume, a fluid residing in said volume, and a lens shaping member contacting an outside of the membrane, which outside faces away from said volume.

Based on the above, the problem underlying the present invention is to provide an optical device that allows to tune the focal length of the device as well to adjust the light beam direction (e.g. for the purpose of image stabilization) in a simple and effective manner.

This problem is solved by an optical device having the features of claim 1.

Preferred embodiments of the optical device are stated in the corresponding sub claims and are described below.

According to claim 1, an optical device is disclosed, which comprises:
- a container forming a fluidic lens, the container comprising a transparent and elastically expandable membrane, a transparent optical element facing the membrane, and a wall member, wherein the optical element and the membrane are connected to the wall member, and wherein said container encloses a volume that is filled with a fluid,
- a lens shaping part that is in contact with said membrane for defining a curvature adjustable area of the membrane, which area faces said optical element, and
- a circumferential lens barrel extending in an axial direction (e.g. the optical axis), which lens barrel surrounds an opening in which at least one rigid lens is arranged that is held by the lens barrel (particularly the lens barrel faces the container in the axial direction), and
- a voice coil motor that is designed to move the lens shaping part along an axial direction (e.g. optical axis) with respect to said container, so as to adjust a curvature of said area and therewith a focal length of the fluidic lens (e.g. for achieving autofocus), wherein the voice coil motor comprises at least one coil arranged on a movable part of the voice coil motor and a plurality of magnetic structures (e.g. each comprising one or several permanent magnets) arranged on a motor holder, wherein said movable part is movably mounted to the motor holder via a spring structure so that it can be moved along said axial direction, and wherein the lens shaping part is mounted to said movable part.

Particularly said at least one rigid lens faces the container/fluidic lens in the axial direction, so that light can pass the container (via the optical element, the fluid, and the curvature adjustable area) and then the at least one rigid lens of the lens barrel (or a stack of rigid lenses held by the lens barrel) to e.g. impinge on an image sensor (see also below) that is arranged in front of the lens barrel (i.e. the lens barrel is arranged between said image sensor and the container).

Further, due to the fact that the membrane can be elastically deformed for adjusting the curvature of said curvature adjustable area, said container and the fluid residing therein form a focus adjustable (or tunable) lens, wherein the focal length of the container/fluidic lens can be adjusted by moving the lens shaping part along the axial direction to achieve the desired focal length. Particularly, the optical device comprises an autofocus function which controls this axial movement of the lens shaping part in order to adjust the focal length of the container/fluidic lens automatically to a desired focal length.

Particularly, the fact that the lens shaping part contacts the membrane can mean that the lens shaping part contacts the membrane directly or indirectly via another material layer (e.g. formed by a glue etc.). The lens shaping part can further be attached to the membrane by bonding it directly to the membrane or via another material layer such as a glue layer.

Particularly, the fluid resides in the volume such that the curvature of the membrane can be adjusted by adjusting the pressure (or force) exerted on the membrane (e.g. via the lens shaping part). Particularly, the fluid fills the volume completely.

Particularly, the notion according to which the lens shaping part defines an area of the membrane that has an adjustable curvature may mean that the lens shaping part delimits, by being attached to the membrane or by contacting the latter, an elastically expandable (e.g. circular) area of the membrane, wherein particularly said area extends up to an (e.g. circumferential) inner edge of the lens shaping part (particularly of a lens shaping ring, see also below). This area may also be denoted as optically active area since the light passes through this area of the fluidic lens and is affected by the curvature of this area.

When the lens shaping part presses (particularly via its lens shaping ring) against the membrane due to the movement of the lens shaping part towards the container, the pressure of the fluid increases due to the essentially constant volume of the fluid in the container causing the membrane to expand and said curvature of said curvature adjustable area of the membrane to increase. Likewise, when the lens shaping part pushes less against the membrane or even pulls the membrane, the pressure of the fluid decreases causing the membrane to contract and said curvature of said curvature adjustable area of the membrane to decrease. Increasing curvature thereby means that said area of the membrane may develop a more pronounced convex bulge, or that said area of the membrane changes from a concave or a flat state to a convex one. Likewise, a decreasing curvature means that said area of the membrane changes from a pronounced convex state to a less pronounced convex state or even to a flat or concave state, or changes from a flat or concave state to an even more pronounced concave state.

The membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar").

Further, the membrane can comprise a coating. Further, the membrane can also be structured, e.g. comprises a structured surface or have a variable thickness or stiffness across the membrane.

Further, said fluid preferably is or comprises a liquid metal, a gel, a liquid, a gas, or any transparent, absorbing or reflecting material which can be deformed. For example, the fluid may be a silicone oil (e.g. Bis-Phenylpropyl Dimethicone). Additionally the fluid may include fluorinated polymers such as perfluorinated polyether (PFPE) inert fluid.

Furthermore, the optical element and/or the at least one rigid lens in the lens barrel is preferably rigid compared to the membrane.

Particularly, according to an embodiment of the present invention, the spring structure is attached to an upper section, particularly to a top side, of the movable part. Particularly, said top side faces away from the image sensor or lens barrel.

Here, particularly, an upper section of the movable part is a section of the movable part that is arranged closer to the container than a lower section of the movable part that is particularly arranged closer to an image sensor of the optical device (see also below).

Further, according to an embodiment of the present invention, the spring structure is connected to the motor holder via magnetic structures comprised by said plurality of magnetic structures. Particularly, all magnetic structures can be used as fastening regions for the spring structure. Particularly, the spring structure can be comprised of separate spring elements, wherein each spring element connects the movable element to a magnetic structure.

Further, according to an embodiment of the present invention, the spring structure is connected to a top side of the respective magnetic structure. Further, each separate spring element can be connected to a top side of the respectively associated magnetic structure.

Here, particularly, a top side of the respective magnetic structure is a side of the respective magnetic structure that is arranged closer to the container than a bottom side of the respective magnetic structure, which bottom side faces away from the top side, and which bottom side is particularly arranged closer to an image sensor of the optical device (see also below) than the top side.

Further, according to an embodiment of the present invention, the movable part is a circumferential member that extends around the lens barrel and may comprise a cylindrical shape. Particularly, the movable part encompasses the lens barrel in a peripheral direction.

Further, according to an embodiment of the present invention, the container is mounted to the motor holder. Particularly, the motor holder forms an opening for receiving the container on a top wall of the motor holder, wherein the container is attached to a circumferential boundary region of said opening.

Further, according to an alternative embodiment of the present invention, the container is mounted to the lens barrel. Here, according to an embodiment, the lens barrel comprises protrusions protruding from a top side of the lens barrel, wherein the container is attached to said protrusions, and wherein the respective protrusion extends through an associated recess of the lens shaping part.

Further, according to an embodiment of the present invention, the motor holder comprises four side wall sections connected to each other to form a circumferential side wall which particularly surrounds the movable part and the lens barrel, wherein said side wall section are particularly connected by a top wall comprising said central opening in which said container is arranged. Particularly, see also above, the container can be connected to a boundary region of the opening or to said protrusions of the lens barrel. In the latter case a gap can be present between the boundary region of the opening and the container. Furthermore, particularly, each two adjacent side wall sections meet and form a corner region on an inside of the motor holder. Particularly, this inside faces the outside of the movable part or the lens barrel.

Further, according to an embodiment of the present invention, the optical device comprises an image sensor facing the lens barrel in the axial direction. Particularly, the image sensor is configured for receiving light traveling through the container and through the at least one rigid lens of the lens barrel. The image sensor can be one of: a CMOS, a CCD, an avalanche diode array, an NMOS, a retina, or any other light sensitive sensor.

Further, according to an embodiment of the present invention, the at least one coil is a circumferential first coil that is attached to the movable part. Particularly, the first coil is arranged on an outside of the movable part facing away from the lens barrel. Further, the first coil extends around the movable part in an annular fashion.

Particularly, the first coil is an electrically conducting coil, and comprises a conductor that is wound or extends around a coil axis. In case of the circumferential first coil, said coil axis runs parallel (or coincides) with said axial direction, i.e., the coil extends around the movable part (and the lens barrel) in a plane that runs perpendicular to said axial direction.

Further, according to an embodiment of the present invention, said plurality of magnetic structures comprises four first magnetic structures attached to the motor holder and arranged along the circumferential first coil so that the four first magnetic structures face the circumferential coil (in a plane extending perpendicular to said axial direction). Particularly, the four first magnetic structures are arranged on an inside of the motor holder facing said outside of the movable part. Furthermore, particularly, the first magnetic structures are each formed by a permanent magnet. Particularly, in a plane comprising the axial direction the magnetization points towards (or away from) the axial direction or optical axis of the optical device. Particularly, the magnetization runs perpendicular to the axial direction.

Further, according to an embodiment of the present invention, each of the four first magnetic structures is arranged in an associated corner region of the motor holder. Alternatively, each of the four first magnetic structures is arranged on an inside of an associated side wall section, particularly in a centered fashion with respect to the peripheral direction of the motor holder, which peripheral direction extends perpendicular to the axial direction.

Further, according to an embodiment of the present invention, said plurality of magnetic structures further comprises four second magnetic structures attached to the motor holder and arranged along the circumferential first coil so that the four second magnetic structures face the circumferential coil (in a plane extending perpendicular to said axial direction). Particularly, the four second magnetic structures are arranged on the inside of the motor holder facing said outside of the movable part, too. Also here, each second magnetic structure may comprise a permanent magnet. Particularly, in plane comprising the axial direction, the magnetization of the respective permanent magnet may point towards (or away from) the axial direction or optical axis of the optical device. Particularly, the magnetization runs perpendicular to the axial direction.

In case an electric current is applied to the circumferential first coil, the first coil interacts with the first and particularly second magnetic structures depending on the direction and magnitude of the current (for a given magnetization of the magnetic structures) so that—depending on the direction of the current in the first coil—the movable part and therewith the lens shaping part is moved along the axial direction towards or away from the container and thereby adjusts the curvature of said curvature adjustable area of the membrane (and therewith the focal length of the container/fluidic lens) accordingly.

Further, according to an embodiment of the present invention, each first magnetic structure is arranged on an inside of an associated side wall section while each second magnetic structure is arranged in an associated corner region of the motor holder.

Further, according to an embodiment of the present invention, the optical device is designed to move the image sensor in a plane perpendicular to said axial direction for achieving optical image stabilization (OIS). This particularly means that the optical device comprises an OIS function that controls said movement in said plane in order to stabilize an image generated by the image sensor when the optical device (e.g. camera) undergoes an (e.g. sudden) unwanted movement.

Thus, besides the axial movement of the lens shaping part that can be used for autofocus (AF) of the optical device, the lateral movement of the image sensor that can be conducted at the same time and independently from the axial movement of the lens shaping part allows to perform OIS.

Alternatively, instead of said lateral movement of the image sensor the image sensor can be fixed and the optical device is then designed—besides generating said axial movement of the lens shaping part—to independently tilt the movable part and therewith the lens shaping part with respect to said axial direction in order to achieve OIS. Due to the tilting movement, the container can be formed into a shape that acts like a prism or wedge so that the container can deflect a light ray passing through the container towards the image sensor in an adjustable manner depending on a tilting angle of the lens shaping part with respect to the axial direction.

Further, when tilting, the voice coil motor is preferably designed to be controlled such that the pressure in the fluid is kept constant, so that the curvature of the membrane is kept constant upon tilting the wall member/optical element.

Furthermore, the same structure can be used to make super resolution imaging using image shifting (instead of OIS). The optical resolution of current cameras especially in mobile phones is limited by the number of pixels available on an image sensor. The implementation of an optical zoom is difficult, expensive and requires a large volume. Particularly, by shifting the image by sub pixels and doing image post processing, the image resolution can be enhanced by a factor of 4 or 9 or even more resulting in a 2× or 3× or even higher zoom factor.

The above-described tilting of the movable part of the voice coil motor and therewith of the lens shaping part can be accomplished by an optical device that comprises a voice coil motor having—besides the circumferential first coil—four second coils, which second coils are arranged below the first coil on a lower section of the movable part, which lower section is connected (e.g. integrally) to said upper section.

Particularly, the second coils are electrically conducting coils, wherein each second coil comprises a conductor that is wound or extends around a coil axis. Here, the respective coil axis of a second coil extends normal to said outside of the movable part or perpendicular to said axial direction (when the movable part is not tilted with respect to the axial direction but is aligned with the axial direction).

Further, according to an embodiment of the present invention, said four second magnetic structures each comprises an upper magnet and a lower magnet, wherein the upper magnet is arranged on top of the lower magnet (so that with respect to the axial direction, the lower magnet is further away from the container), wherein each upper magnet faces (in a plane extending perpendicular to said axial direction) an upper section of an associated second coil, and wherein each lower magnet faces (in said plane) a lower section of an associated second coil.

Particularly, the upper and lower magnets of each second magnetic structure comprise a magnetization that is aligned with the coil axis of the associated second coil. Further, particularly, the magnetizations of the respective upper and lower magnet are anti-parallel. Particularly, the magnetization of the upper magnets may point towards the lens barrel and the magnetizations of the lower magnets may point away from the lens barrel (or vice versa). Particularly, in a plane comprising the axial direction, the magnetization may point towards (or away) from the axial direction/optical axis. Particularly, the magnetization may extend perpendicular to the axial direction/optical axis.

Applying suitable currents to the second coils, the latter interact with the associated magnets of the second magnetic structures so that the movable part is tilted with respect to the optical axis when said currents are controlled correspondingly. At the same time said axial movement of the lens shaping part can be generated using the circumferential first coil's interaction with the first magnetic structures and particularly with the upper magnets of the second magnetic structures.

While in the embodiment described above one has a circumferential first coil interacting with the first magnetic structures (e.g. permanent magnets) and the upper magnets of the second magnetic structures for generating axial movement of the lens shaping part, as well as four second coils interacting with the second magnetic structures to tilt the movable part with respect to the axial direction so that the corresponding deformation of the membrane/container yields a deflection of a light ray that passes the container towards the image sensor, there is an alternative embodiment to be described below, which does not need said first magnetic structures.

Here, in this alternative embodiment of the present invention, the optical device/voice coil motor comprises four coils, which are arranged on the movable part, particularly on an outside of the movable part that faces away from the lens barrel.

Particularly, these coils are electrically conducting coils, wherein each coil comprises a conductor that is wound or extends around a coil axis. Here, the respective coil axis of such a coil extends normal to said outside of the movable part or perpendicular to the axial direction (when the movable part is not tilted with respect to the axial direction but is aligned with the axial direction).

Further, particularly, each of said four coils interacts with an associated magnetic structure (here four magnetic structures), wherein each of these magnetic structures is arranged on the motor holder (particularly on an inside of the motor holder facing said outside of the movable part). Furthermore, particularly, each of said four magnetic structures comprises an upper magnet and a lower magnet as before, wherein the upper magnet is arranged on top of the lower magnet (so that with respect to the axial direction, the lower magnet is further away from the container), wherein each upper magnet faces (in a plane extending perpendicular to said axial direction) an upper section of an associated coil and wherein each lower magnet faces (in said plane) a lower section of an associated coil.

Particularly, the upper and lower magnets of each magnetic structure comprise a magnetization that is counter-directional. Particularly, in a plane comprising the axial direction/optical axis, the magnetization of the upper magnets may point towards the optical axis and the magnetizations of the lower magnets may point away from the optical axis/axial direction. Particularly, the respective coil axis is aligned with the magnetizations of the associated magnetic structure.

The fact that—in the above embodiments—the movable part is connected at an upper section to the motor holder via the spring structure advantageously means that a sufficient lever is provided for the tiling of the moveable part which uses the second coils arranged on a lower section of the movable part. Thus the tilting/OIS function requires only a relatively small force.

Further, having the first coil located in the upper section of the movable part yields an improved lateral position stability and less cross-talk between the axial movement of the lens shaping part (AF) and a tilting movement of the movable part (OIS). Particularly, the first coil stays in approximately the same distance to the respective magnetic structure despite tilting of the movable part.

Further, according to an embodiment of the present invention, the optical device comprises a driver for controlling currents applied to said first coil and said second coils, wherein said driver comprises a first channel for applying a current to the first coil, a second channel for applying currents to two opposing second coils, such that the currents delivered to the opposing second coils have the same magnitude but opposite sign, and a third channel for applying currents to two other opposing second coils, such that the currents delivered to said other opposing second coils have the same magnitude but opposite sign.

Thus, using such a three-channel-driver, the axial movement of the lens shaping part, and at the same time, the tilting of the movable part/lens shaping part can be controlled in case of a circumferential first coil (AF) and four second coils (OIS).

Further, in case said first coil is omitted and four coils are used to generate an axial movement as well as a tilting movement of the movable part/lens shaping part, the optical device comprises—according to a further embodiment—a driver circuit for controlling currents applied to said coils, wherein said driver comprise four channels for applying a current to each coil, so that each coil can be independently controlled. Here each coil can be controlled individually so that said axial movement and said tilting movement can be achieved by applying a corresponding current to selected coils.

According to yet another embodiment of the present invention, the lens shaping part comprises a lens shaping ring protruding from an annular mounting structure, wherein said mounting structure comprises a central opening around which the lens shaping ring extends.

Further, according to an embodiment of the present invention, said mounting structure comprises said recesses (e.g. through holes) through which said protrusions of the lens barrel extend that are used in an embodiment to mount the container to the lens barrel.

Particularly, each recess can be formed as a curved elongated through hole that extends along an outer edge of the mounting structure.

Further, according to an embodiment of the present invention, the lens shaping ring can be plasma bonded to the membrane.

Further, according to an embodiment of the present invention, In case the container is mounted to the motor holder, the mounting structure of the lens shaping part may not comprise recesses apart from the central opening.

Further, according to an embodiment of the present invention, the mounting structure comprises a circumferential edge delimiting said central opening which edge is formed by a first circumferential surface of the mounting structure and an adjacent second circumferential surface, which surfaces meet to form said edge, and wherein each of these surfaces may comprise a concave shape. This allows to reduce stray light. Particularly, any cylindrical wall parallel to the optical axis would reflect stray light towards the image sensor. The circumferential edge acts as a light baffle and stray light from beyond the field of view is mostly reflected back out of the optical device/camera module and not towards the image sensor.

Particularly, the first surface extends from the edge to a face side of the lens shaping ring, while the second surface extends from said edge to a bottom side of the mounting structure.

Further, according to an embodiment of the present invention, the mounting structure covers an annular section of the membrane for protection of the membrane, which annular section surrounds said curvature adjustable area of the membrane.

Further, according to an embodiment of the present invention, an outer edge region of the mounting structure is attached to a fastening region of the moveable part which fastening region protrudes from an inside of the movable part. Particularly, said inside faces the lens barrel.

Particularly, in an embodiment, a bottom side of the outer edge region/mounting structure, which bottom side faces the lens barrel and/or the image sensor, is bonded to an upper side of the fastening region, which upper side of the fastening region faces away from the lens barrel. Here, a glue line can be arranged on an upper side of the edge region/mounting structure and bond the latter to the moveable part.

Furthermore, in an alternative embodiment, a top side of the outer edge region/mounting structure, which top side faces away from the lens barrel and/or the image sensor, is bonded to a bottom side of the fastening region, which faces the lens barrel.

Further, according to yet another embodiment of the present invention, the wall member and the optical element are separate parts that are connected to one another. Alternatively, the wall member is integrally formed with the optical element. Here the wall member and the optical element form one continuous part.

The wall member can be formed out of a metal, silicon, a glass, a plastic, a polymer. It can comprise or can be formed as a (e.g. glass) flat window, a lens, a mirror, a micro structured element with refractive, diffractive and/or reflective structures.

In case the wall member and the optical element are integrally connected to each other, the wall member and optical element are particularly formed out of a glass, or a transparent plastic or polymer.

Particularly, said optical element can form a rigid lens, particularly a converging lens. Furthermore, the rigid lens can be a plano-convex lens. Particularly, the optical element may comprise a convex surface area facing away from said membrane.

Further, according to an embodiment of the present invention, the wall member comprises one of (with respect to a plane extending perpendicular to the axial direction): a circular periphery, a square periphery, a hexagonal periphery. This means that the container comprises, when looking onto the container in the axial direction a circular, square or hexagonal footprint.

Furthermore, an outer surface of the optical element facing away from the membrane and/or an inner surface of the optical element facing the membrane can comprise an anti-reflective coating.

Furthermore, in order to reduce flare, straylight or ghostlight the membrane can comprise an anti-reflective coating. The anti-reflective coating can consist of a subwavelength nanostructure layer, one or several index-matching layers, or another suitable coating.

Furthermore, according to an embodiment, a transparent part of the container (e.g. glass window) can have an anti-reflective coating on an outside surface (facing the outside medium, mostly air) and it can additionally have an anti-reflective coating on an inside surface (facing the fluid/liquid in the container). Alternatively, the inside or outside surface of this transparent part of the container can have a coating that rejects infrared light and thus act as an IR filter. Particularly an IR filter in front of the image sensor can be omitted.

Further, according to an embodiment of the present invention, for measuring the spatial position of the movable part, the optical device comprises at least a first and a second inductive measurement coil.

Particularly, according to an embodiment of the present invention, the first and the second inductive measurement coil each extend around an associated second magnetic structure, wherein said second magnetic structures are neighboring second magnetic structures (with respect to a peripheral direction of the movable element). Thus, in case the movable part is tilted and/or moved along the axial direction, the magnetic flow through the respective measurement coil changes when the associated coil or second coil moves relative to the respective measurement coil which generates a corresponding voltage signal in the respective measurement coil. From these signals, the spatial position of the movable part can be derived. These signals can be used as feedback signals for a closed-loop control of the axial and/or tilting movement of the movable part and therewith of the focal length and light ray deflection.

Also in case of the embodiment that omits the circumferential first coil, the first and the second inductive measurement coil may each extend around an associated magnetic structure, wherein said magnetic structures are neighboring magnetic structure (with respect to a peripheral direction of the movable element).

Further, according to an alternative embodiment of the present invention, the first inductive measurement coil extends below two opposing second magnetic structures, while the second inductive measurement coil extends below two other opposing second magnetic structures. Here, the inductive measurement coils each extend in a plane that extends perpendicular to the axial direction. Further, particularly, the measurement coils can be integrated into a flex PCB that extends below the respective opposing coils. Here, particularly, below means that second magnetic structures are arranged between the inductive measurement coils and the container with respect to said axial direction.

Again, in case the circumferential first coil is omitted, the first inductive measurement coil may also extend below two opposing magnetic structures, while the second inductive measurement coil extends below two other opposing magnetic structures. Also here, the inductive measurement coils may each extend in a plane that extends perpendicular to the axial direction. Further, particularly. the inductive measurement coils can also be integrated into a flex PCB that extends below the respective opposing coils. Also here, particularly, below means that magnetic structures are arranged between the inductive measurement coils and the container with respect to said axial direction.

Further, according to yet another embodiment of the present invention, the first inductive measurement coil extends below a second magnetic structure, while the second inductive measurement coil extends below a neighboring second magnetic structure. Here, the inductive measurement coils can each extend in a plane that extends perpendicular to the axial direction. Further, particularly. the inductive measurement coils can be integrated into a flex PCB that extends below the respective second magnetic structure. Also here, particularly, below means that the respective second magnetic structure is arranged between the respective inductive measurement coil and the container with respect to said axial direction.

Further, according to an embodiment of the present invention—in the absence of a circumferential first coil, the first inductive measurement coil extends below a magnetic structure, while the second inductive measurement coil extends below a neighboring magnetic structure. Here, the inductive measurement coils can each extend in a plane that extends perpendicular to the axial direction. Further, particularly, the inductive measurement coils can be integrated into a flex PCB that extends below the respective coil. Also here, particularly, below means that the respective magnetic structure is arranged between the respective inductive measurement coil and the container with respect to said axial direction.

Furthermore, according to yet another embodiment of the present invention, the membrane of the fluidic lens/container comprises a thickness that is equal to or larger than 2 μm and/or that is smaller or equal to 100 μm. Further, according to an embodiment of the present invention, the membrane comprises a pre-strain that is smaller or equal to 100%. This percentage relates to the original length (e.g. radius) of the membrane/material. Particularly, said pre-straining is performed in all radial directions. For example, in case said pre-strain amounts to 100% the original radius of the material has been doubled due to the pre-straining.

Further, according to an embodiment of the present invention, the membrane comprises a circumferential boundary region connected to a bottom side of the wall member, which bottom side faces the lens shaping part, wherein a plurality of deformable stops are arranged on a top side of the mounting structure of the lens shaping part, so that said boundary region of the membrane can contact said stops when the lens shaping part is moved towards the container in order to protect the boundary region of the membrane with respect to being squeezed between the wall member and the mounting structure of the lens shaping part.

Further, according to an embodiment of the present invention, the optical device comprises a plurality of stops for constraining a movement of the lens shaping part and/or of the movable part along the axial direction as well as in a plane extending perpendicular to said axial direction (i.e. a constraint in all spatial directions).

Further, according to an embodiment of the present invention, the optical device comprises stops in the periphery of the mounting structure for constraining a movement of the lens shaping part along the axial direction towards the container as well as in a plane extending perpendicular to said axial direction.

Further, according to an embodiment of the present invention, a top side of the lens barrel, which top side faces the container and the lens shaping part forms a stop for constraining a movement of the lens shaping part along the axial direction away from the container.

Further, according to an embodiment of the present invention, the membrane comprises a fully deflected state in which the curvature-adjustable area is maximally bulged towards the at least one rigid lens of the lens barrel, which forms a first rigid lens of the lens barrel (i.e. topmost lens of the lens barrel, i.e. a lens that is closest to the container in the axial direction), wherein the container is arranged such with respect to the lens barrel that a pre-defined safety clearance is provided between the curvature adjustable area of the membrane and the first rigid lens in the axial direction.

Further, according to an embodiment of the present invention, the image sensor is mounted to an image sensor carrier, which comprises a circumferential sidewall, wherein the sidewall comprises an internal thread that engages with an external thread of an end section of the lens barrel, so that a distance between the lens barrel and the image sensor in the axial direction can be adjusted.

Further features and advantages of the present inventions as well as embodiments of the present invention shall be described in the following with reference to the Figures, wherein FIGS. 1-3 show schematical cross sectional views of an optical device according to the invention having a container (fluidic lens) and a lens shaping part acting on a membrane of the container for adjusting the focal length and the deflection of light rays passing through the fluidic lens;

FIG. 19 shows a perspective cross sectional view of a modification of the embodiment shown in FIG. 16 wherein now four coils are arranged on the housing of the device while the associated magnets and their magnetic flux return structures are arranged on the wall member of the container;

Figure 1:
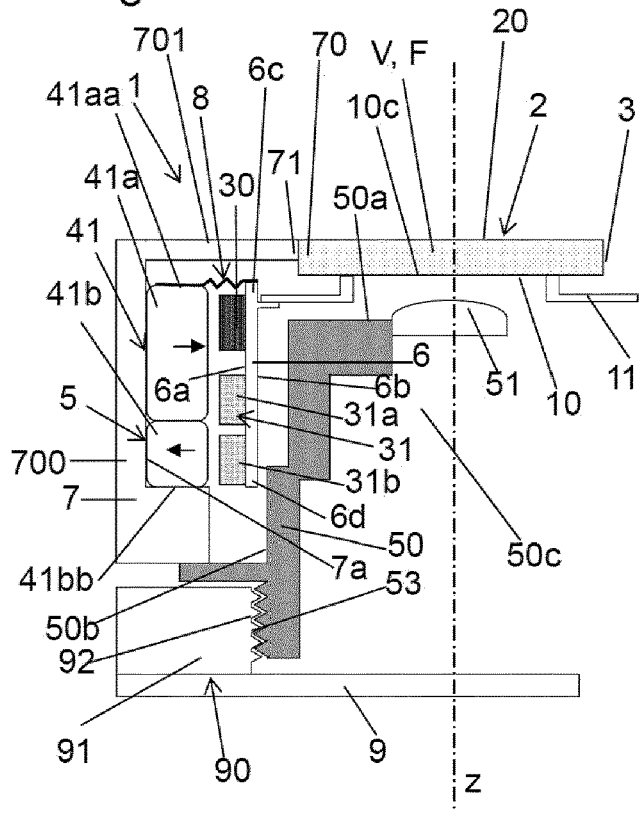

FIGS. 1 to 3 and 4 to 7 show different embodiments of an optical device 1 according to the present invention. Such an optical device 1 can be used in a camera for providing autofocus (AF) and optical image stabilization (OIS). The optical device 1 comprises at least a container 2 forming a fluidic lens, wherein the container 2 comprises a transparent and elastically expandable membrane 10, a transparent optical element 20 (e.g. a glass plate or lens) facing the membrane 10, and a wall member 3, wherein the optical element 20 and the membrane 10 are connected to the wall member 3, and wherein said container 2 encloses a volume V that is filled with a fluid F. The device 1 further comprises a lens shaping part 11 that is in contact with said membrane 10 for defining a curvature adjustable area 10c of the membrane 10, which area 10c faces said optical element 20, and a circumferential lens barrel 50 extending in an axial direction z (optical axis). The lens barrel 50 surrounds an opening 50c in which at least one rigid lens 51 is as arranged that is held by the lens barrel 50. The at least one rigid lens 51 faces the container/fluidic lens 2 in the axial direction z. Particularly, the optical device 1 can form a camera. Here, the optical device 1 also comprises an image sensor 9 that is carrier by an image sensor carrier 90 comprising a circumferential sidewall 91 into which an internal thread 92 is formed that engages with an external thread 53 of the lens barrel 50 that is formed on an end section of the lens barrel. Thus, by screwing the lens barrel into the image sensor carrier 90, a distance between the image sensor 9 and the lens barrel can be adjusted/calibrated.

Furthermore, the device 1 comprises a voice coil motor 5 that is designed to move the lens shaping part 11 at least along said axial direction z with respect to said container 2, so as to adjust a curvature of said area 10c and therewith a focal length of the fluidic lens 2, wherein the voice coil motor 5 comprises at least one coil 30 or several coils 30, 31 arranged on a movable part 6 and a plurality of magnetic structures 40, 41 arranged on a motor holder 7, wherein said movable part 6 is movably mounted to the motor holder 7 via a spring structure 8 so that it can be moved along said axial direction z. Further, the lens shaping part 11 is mounted to said movable part 6 so that it can be actuated using the voice coil motor 5.

Figure 2:
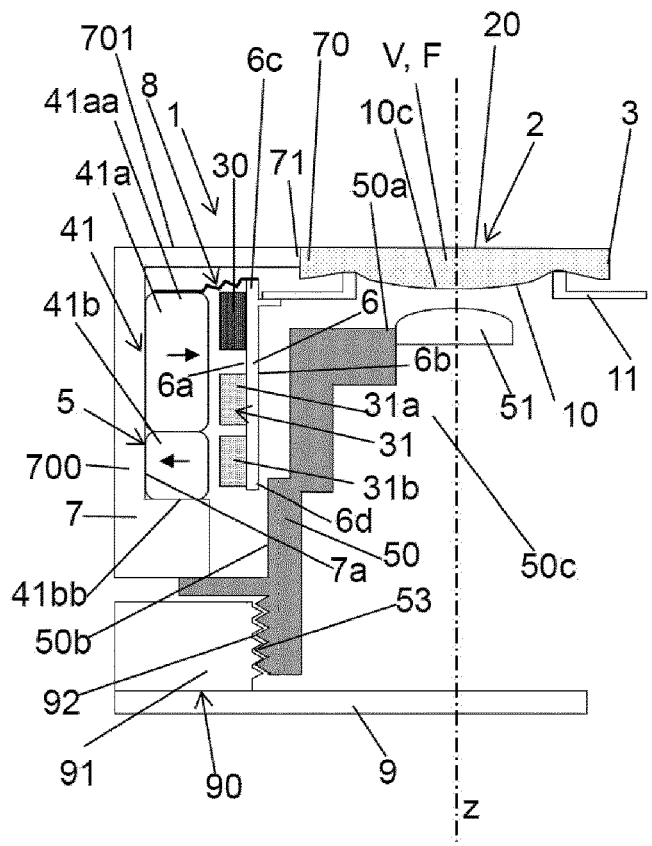
Figure 3:
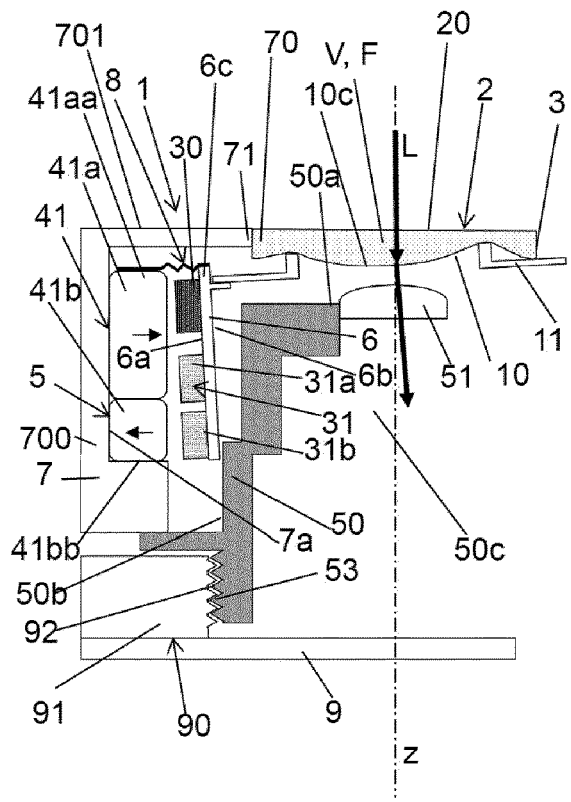
Figure 4:
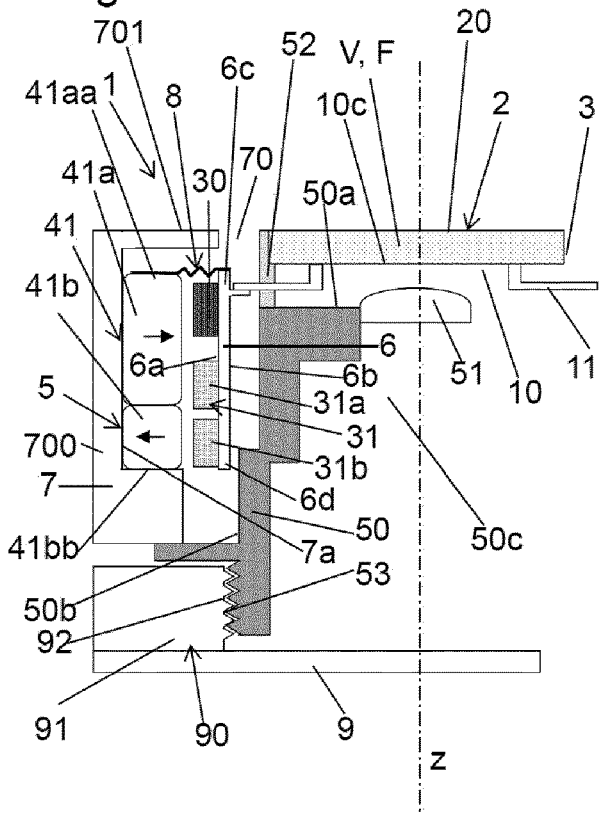
FIGS. 4-6 show schematical cross sectional views of a further embodiment of the optical device according to the present invention.
Figure 5:
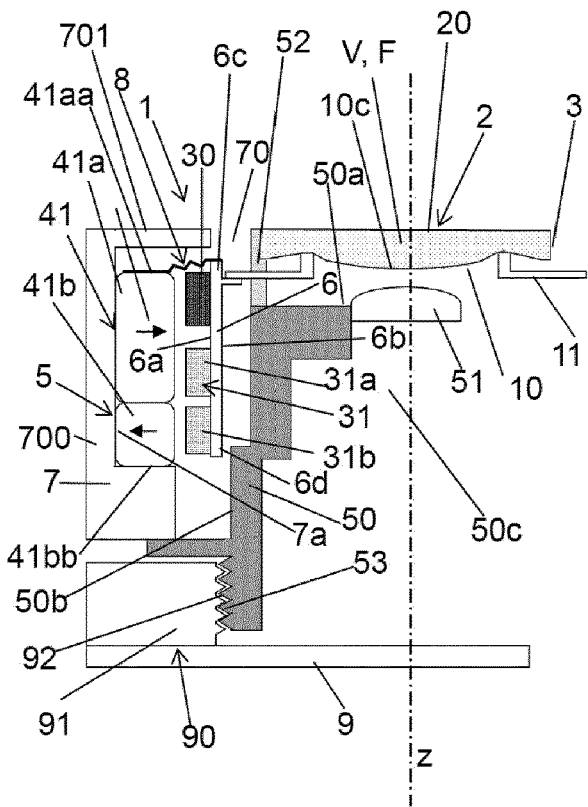
Figure 6:
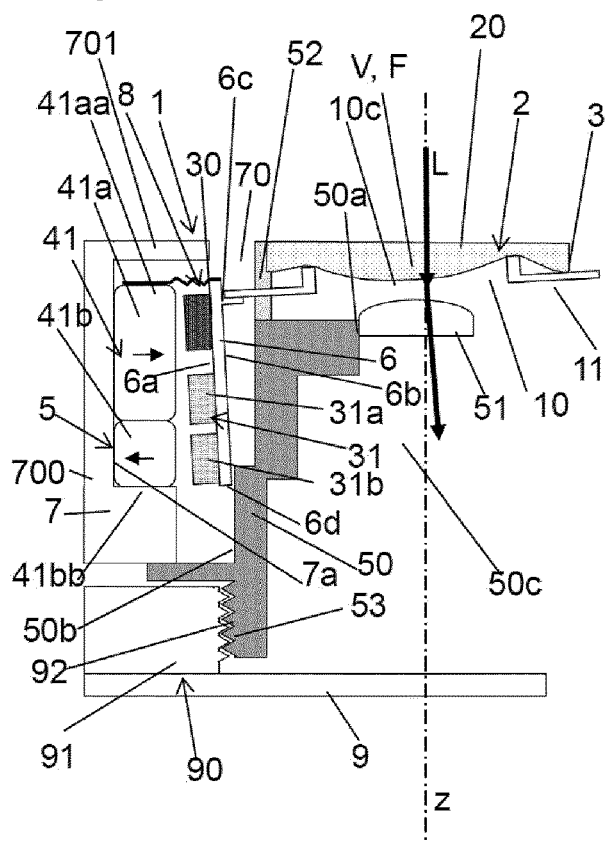

In the embodiment shown in FIGS. 1 to 3, the spring structure 8 is attached to an upper section 6c, here e.g. to a top side, of the movable part 6 on one side and on the other side to the motor holder 7 via second magnetic structures 41, namely to top sides 41aa of the respective magnetic structure 41.

Particularly, the moveable part 6 is a circumferential member that extends around the lens barrel 50 and thus encompasses the latter in a peripheral direction (that runs perpendicular to the axial direction z)

In the embodiment shown in FIGS. 1 to 3, the container 2 is mounted to the motor holder 7. Here, the motor holder 7 forms an opening 70 for receiving the container 2, which is attached to a circumferential boundary region 71 of said opening 70.

The motor holder 7 may comprise four side wall sections 700 connected to each other to form a circumferential side wall (cf. also FIGS. 9 to 13), wherein said side wall sections 700 are connected by a top wall 701 comprising a central opening 70 in which said container 2 is arranged, wherein the container 2 is connected to a boundary region 71 of the opening 70. Further, each two adjacent side wall sections 700 meet and form a corner region 702 on an inside 7a of the motor holder 7, which inside 7a faces an outside 6a of the movable part 6. The outside 6a faces away from the lens barrel 50.

In detail, for moving the lens shaping part 11 axially (i.e. back and forth said axial direction z), the voice coil motor 5 comprises according to the embodiment shown in FIGS. 1 to 3 an electrically conducting circumferential first coil 30 that is attached to the outside 6a of the movable part 6 and extends around the movable part 6 and the lens barrel 50 in an annular fashion. The first coil 30 comprises a conductor that is wound or extends around a coil axis z, which coincides with the axial direction z.

Figure 7:
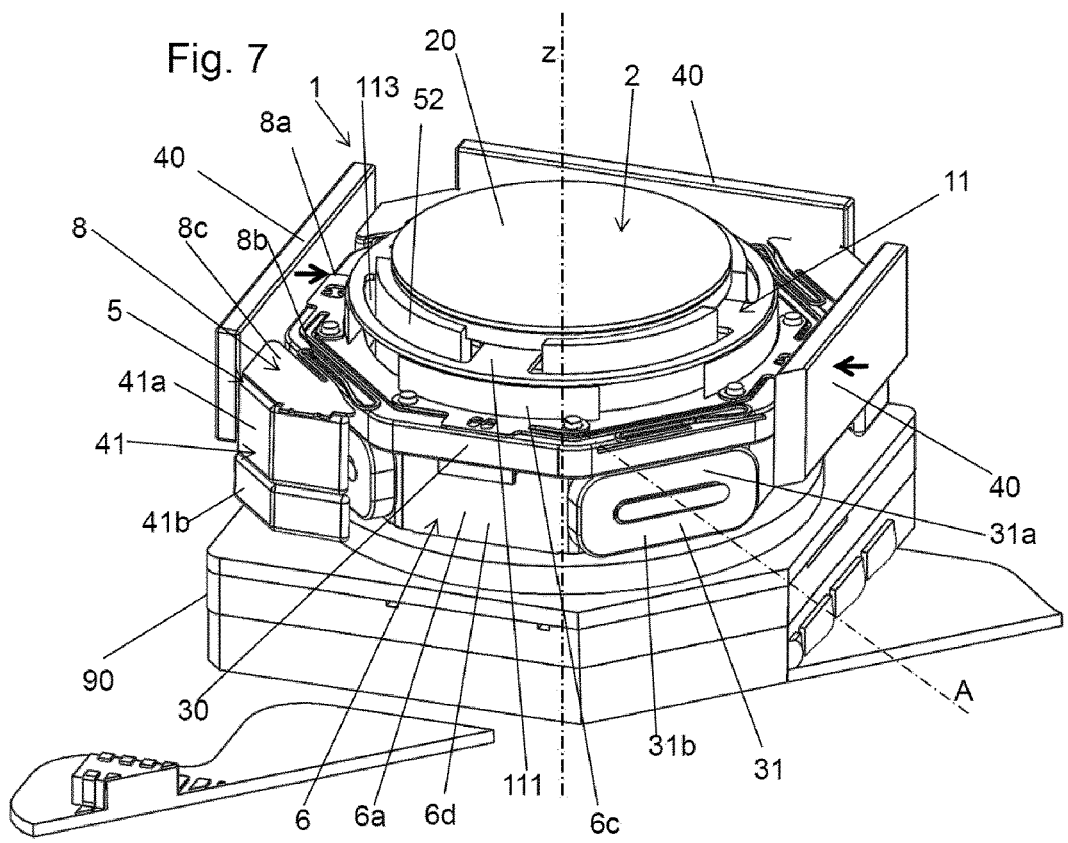
FIG. 7 shows a perspective view of an optical device of the kind shown in FIGS. 4-6.
Figure 12:
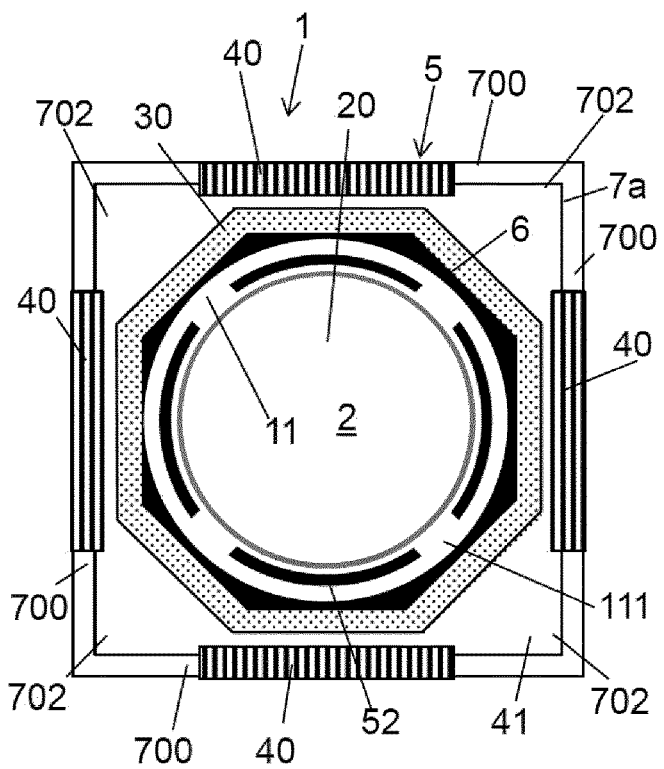
Figure 13:
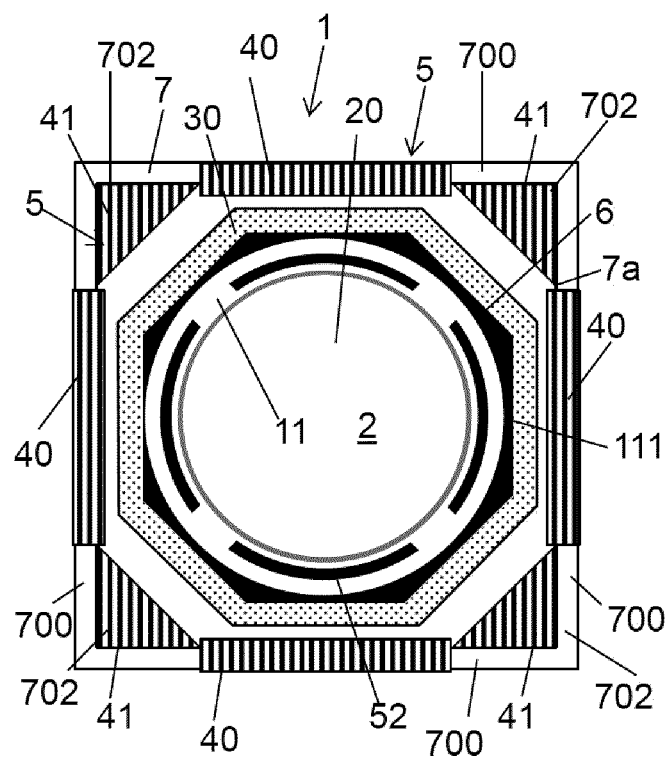

The first coil 30 is configured to interact with at least four first magnetic structures 40, which are not shown in FIGS. 1 to 3 but can be seen in FIG. 7 as well as in FIGS. 12 and 13. The first magnetic structures may be formed by permanent magnets 40 as shown in FIG. 7. Particularly, said first magnetic structures 40 are attached to the motor holder 7 and arranged on an inside 7a of the motor holder 7 along the circumferential first coil 30 so that the four first magnetic structures 40 each face the circumferential first coil 30 in a plane extending perpendicular to said axial direction z as well as the outside 6a of the movable part 6. Particularly, the magnetization of the respective first magnetic structures/ permanent magnet 40 extends perpendicular to the axial direction/optical axis z and may—in a plane comprising the axial direction/optical axis z—point toward (or alternatively away) from the axial direction/optical axis z of the optical device 1.

Further, the optical device shown in FIGS. 1 to 3 comprises four second magnetic structures 41 (cf. also FIG. 7) that are also attached to the motor holder 7 and arranged along the circumferential first coil 30 so that the four second magnetic structures 41 face the circumferential coil 30. The four second magnetic structures 41 are also arranged on the inside 7a of the motor holder 7 and face said outside 6a of the movable part 6, too. However, while the first magnetic structures 40 are arranged on a respective side wall section 700 of the motor holder, the second magnetic structures are particularly each arranged in an associated corner region 702 formed by two meeting wall section 700 as will be described further below in conjunction with FIGS. 9 to 13.

Furthermore, as indicated in FIGS. 1 to 3, said four second magnetic structures 41 each comprises an upper magnet 41a and a lower magnet 41b, wherein the upper magnet 41a is arranged on top of the lower magnet 41b so that with respect to the axial direction z, the lower magnet 41b is further away from the container 2. Further, each upper magnet 41a faces besides said first coil 30 an upper section 31a of an associated electrically conducting second coil 31, while the corresponding lower magnet 41b faces a lower section 31b of the respective second coil 31. As can be seen from FIGS. 1 to 3, the second coils 31 of the voice coil motor 5 are arranged below the first coil 30 on a lower section 6d of the moveable part 6. Further, each second coil 31 comprises a conductor that is wound or extends around a coil axis A (cf. FIG. 7), wherein the respective coil axis A of a second coil 31 extends normal to said outside 6a of the movable part 6 or perpendicular to the axial direction z (when the movable part 6 is not tilted with respect to the axial direction z but is aligned with the axial direction z). Regarding the respective coil axis A, the upper and lower magnets 41a, 41b of each second magnetic structure 41 comprise a magnetization (represented by an arrow in FIGS. 1 to 3) that is aligned with the coil axis A of the associated second coil 31. Further, particularly, the magnetizations of the respective upper and lower magnet 41a, 41b are antiparallel. Particularly, in a plane comprising the axial direction/optical axis z the magnetization of the upper magnets 41a may point towards the lens barrel 50 and the magnetizations of the lower magnets 41b may point away from the lens barrel 50 (or vice versa). Particularly, the magnetization of the upper and lower magnets 41a, 41b is perpendicular to the optical axis/axial direction z.

Depending on the direction and magnitude of an electrical current applied to the first coil 30, the latter interacts with the first magnetic structures 40 and the upper magnets 41b of the second magnetic structures 41 and is either moved upwards in the axial direction z (as shown in FIG. 2) or downwards (transition from FIG. 2 to FIG. 1) with respect to said magnetic structures 40, 41 which are fixed on the motor holder 7. Since the first coil 30 is arranged on the movable part 6 of the voice coil motor, the latter is moved upwards or downwards against the action of the spring structure 8 that provides a restoring force and takes along the lens shaping part 11 that is mounted to the upper section 6c of the moveable part 6. In case the lens shaping part 11 is moved upwards/towards the container 2 with the movable part 6, the lens shaping part 11 presses against the membrane 10 causing the curvature adjustable area 10c to bulge further out, which is shown in FIG. 2.

Applying suitable electrical currents to the second coils 31, the movable part 6 can be tilted about two independent axis running perpendicular to the axial direction z. Such a tilting is shown in FIG. 3. Here, the second coil 31 shown in FIG. 3 is moved away from the associated second magnetic structure 41. Furthermore (not shown in FIG. 3), a further second coil 31 that opposes the second coil 31 shown in FIG. 3 can at the same time be moved closer to another second magnetic structure 41 that opposes the second magnetic structure shown in FIG. 3 (cf. e.g. FIGS. 9 to 13 which will be described further below).

Tilting the lens shaping part 11 as shown in FIG. 3 deforms the container 2 such that light L that passes through the container 2 is deflected. Thus, the location at which a light ray L impinges on an image sensor 9 that is arranged in front of the lens barrel 50 can be shifted by tilting the movable part 6/lens shaping part 11 correspondingly. This allows one to conduct optical image stabilization OIS, i.e., in case the location at which light impinges on the image sensor is shifted due to a sudden unwanted movement of the optical device 1 the respective light rays can be deflected so as to compensate said shift. At the same time the, the focal length of the fluidic lens/container 2 can be adjusted by an independent axial movement of the movable part 6/lens shaping part in the axial direction z which can be used to provide autofocus (AF) of the optical device 1.

Generally, in both cases (axial movement and tilting) the forces generated by the respective coil 30, 31 and associated magnetic structure 40, 41 act parallel to the optical axis/axial direction z. While in case of the axial movement all force vectors point in the same direction (upwards or downwards along the axial direction z), the forces generated by coils 31 and associated magnetic structures 41 can point upwards (parallel to the axial direction) or downwards for an opposing coil 31 magnetic structure 41 pair (depending on the direction of the electrical current in the respective coil 31). Particularly, in case opposing coils 31 comprise the opposite current direction the generated (Lorentz) forces point in opposite directions. Thus, a corresponding torque acts on the movable part 6 and the latter is tilted accordingly.

The fact, that the first coil 30 (AF) is located on the upper section 6c top of the movable part 6 yields a better lateral position stability and less cross-talk between AF and OIS, since the first coil 30 stays in approximately the same distance to the first magnetic structures 40 and the upper magnets 41a of the second magnetic structures 41 despite OIS tilting.

Furthermore, the spring structure 8 being fastened to the upper section 6a, particularly top side, of the movable part 6 results in a lower force required for tilting the movable part 6 (OIS). Finally, the second (OIS) coils 31 are located on the lower section 6d of the movable part 6 providing a good long lever arm for tilting the movable part 6/lens shaping part 11.

Figure 19:
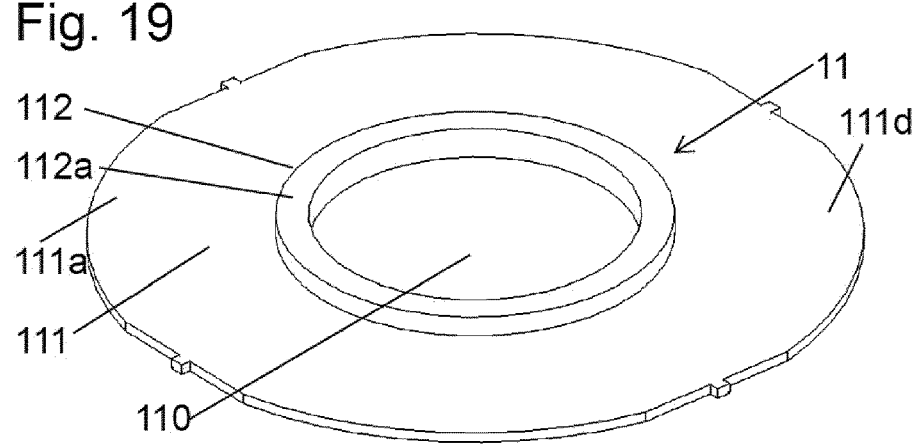
FIG. 19 shows a perspective view of an alternative lens shaping part without protrusion recesses that can be used e.g. in the embodiments shown in FIGS. 1 to 3.

Particularly, regarding the embodiment shown in FIGS. 1 to 3, the lens shaping part 11 can be formed as shown in FIG. 19 and comprises a lens shaping ring 112 protruding from an annular mounting structure 111, wherein said mounting structure 111 comprises a central opening 110 around which the lens shaping ring 112 extends. The opening 110 allows light L to pass the lens shaping part 11 towards the lens barrel 50/rigid lenses 51 and the image sensor 9.

The lens shaping ring 112 comprises a face side 112a which acts on the membrane 10 and thus defines/delimits the curvature adjustable area 10c of the membrane 10 as well as the curvature of this area 10c (and therewith the focal length of the fluidic lens/container 2). Particularly, the lens shaping ring 112/face side 112a can be plasma bonded to the membrane 10. The mounting structure 111 covers a part (e.g. annular section 10b) of the membrane 10 and thus protects the membrane 10.

Figure 29:
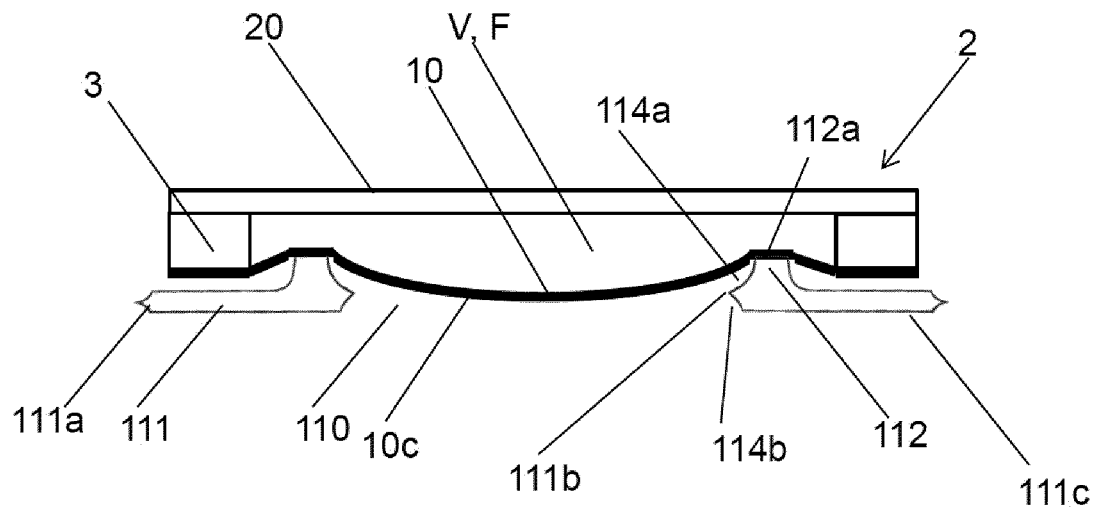
FIG. 29 shows a schematical cross sectional view of a container of an optical device according to the present invention, wherein the lens shaping part comprises a sharp edge of its central opening formed by concave surfaces for reduction of stray light.

As further shown in FIG. 29, for reducing the influence of stray light, the mounting structure 111 may optionally comprises a circumferential edge 111b delimiting said central opening 110 of the mounting structure 111 which edge 111b is formed by a first circumferential surface 114a of the mounting structure 111 and an adjacent second circumferential surface 114b, which surfaces 114a, 114b meet to form said sharp edge 111b, wherein each of these surfaces 114a, 114b comprises a concave shape. Particularly, the first surface 114a extends from the edge 111b to said face side 112a of the lens shaping ring 112, while the second surface 114b extends from said edge 111b to a bottom side 111c of the mounting structure 111.

Figure 23:
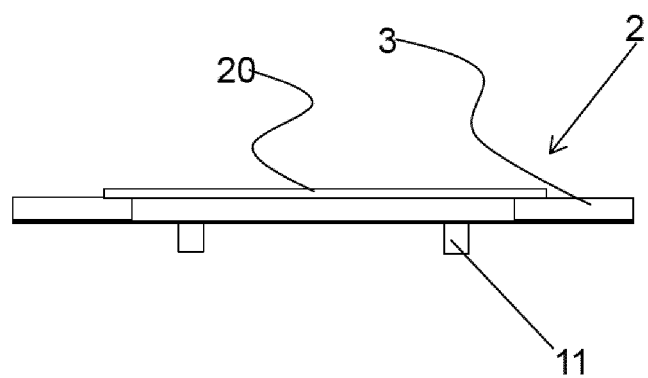
FIG. 23 shows a schematical cross sectional view of a container (fluidic lens) of the optical device according to the present invention having an optical element connected to a separate wall member of the container.
Figure 24:
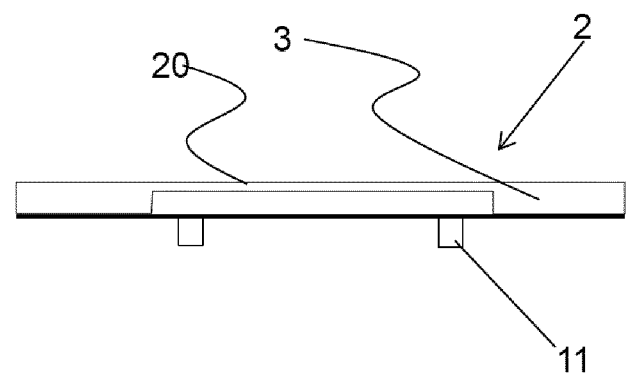
FIG. 24 shows a schematical cross sectional view of a container (fluidic lens) of the optical device according to the present invention wherein the optical element is integrally connected to the wall member.
Figure 25:
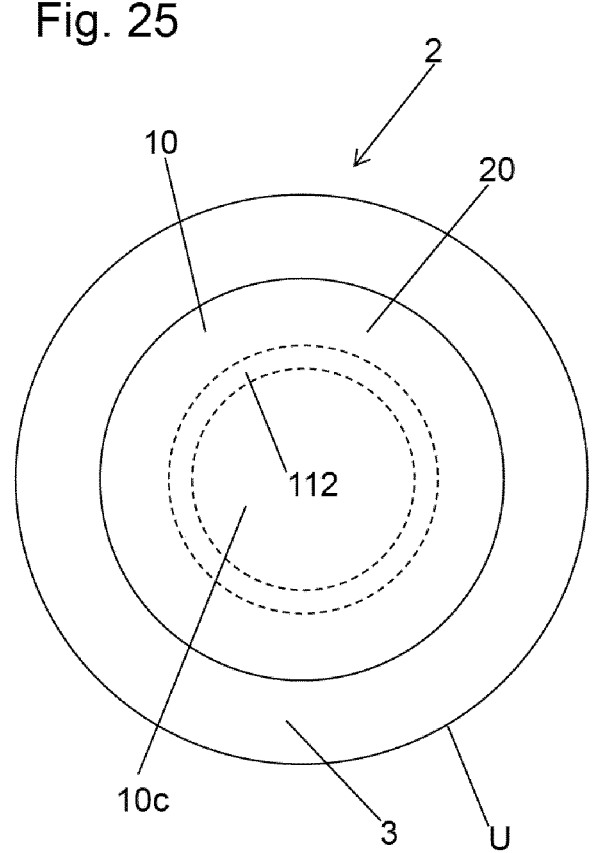
FIGS. 25-27 show schematical top views of containers of optical devices according to the present invention comprising different periphery contours.
Figure 26:
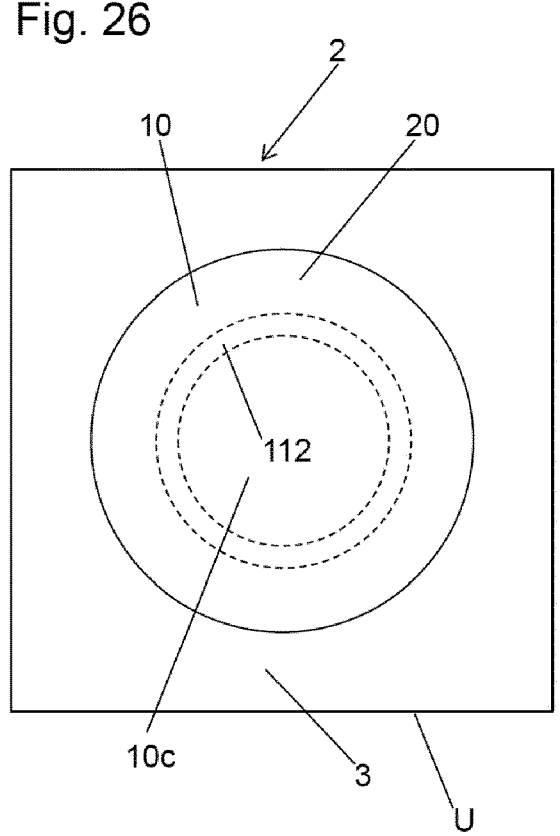
Figure 27:
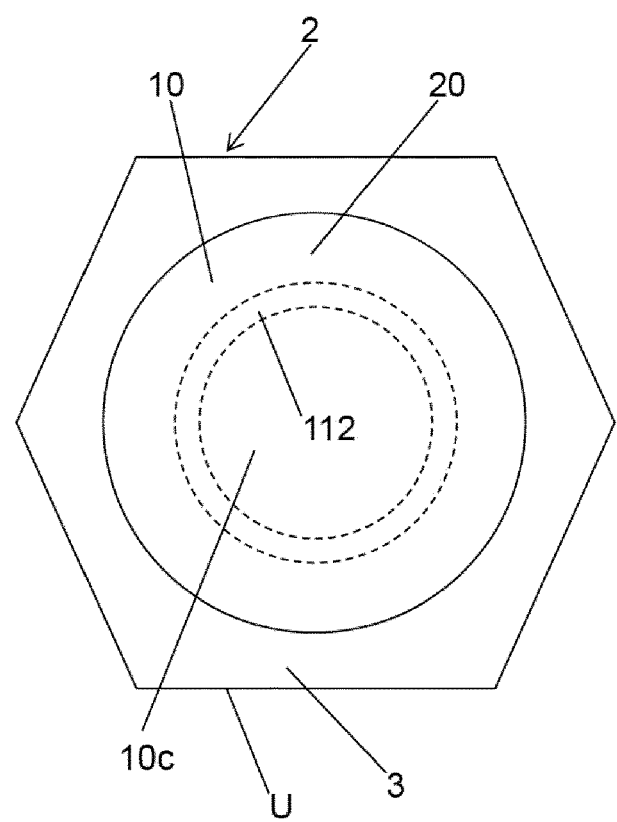
Figure 28:
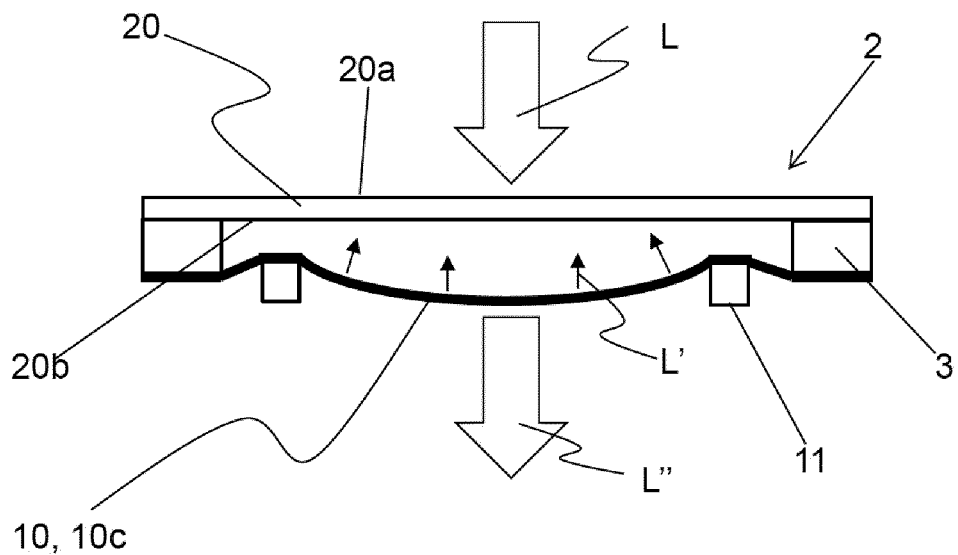
FIG. 28 shows a schematical cross sectional view of a container of an optical device according to the present invention.

Furthermore, as shown in FIGS. 23 and 24, in all embodiments, the container 2 can either comprise a separate wall member 3 and optical element 20 as indicated in FIG. 23, or, alternatively, a wall member 3 that is integrally formed with the optical element 20. Further, in all embodiments, the container 2 may have a circular outline or periphery U, which may also have a square (cf. FIG. 26) or a hexagonal shape (cf. FIG. 27). Furthermore, as indicated in FIG. 28, in all embodiments (particularly FIGS. 23 and 24), an outer surface 20a of the optical element 20 facing away from the membrane 10 and/or an inner surface 20b of the optical element 20 facing the membrane 10 can comprise an anti-reflective coating. Alternatively, the inner surface 20b or the outer surface 20a of the optical element 20/transparent part of the container 2 can have a coating that rejects infrared light (IR) and thus act as an IR filter, particularly replacing an IR filter in front of the image sensor 9.

Furthermore, in order to reduce flare, stray light or ghost light, the membrane 10 can comprise an anti-reflective coating. The anti-reflective coating can consist of a sub-wavelength nanostructure layer, one or several index-matching layers, or another suitable coating.

Figure 16:
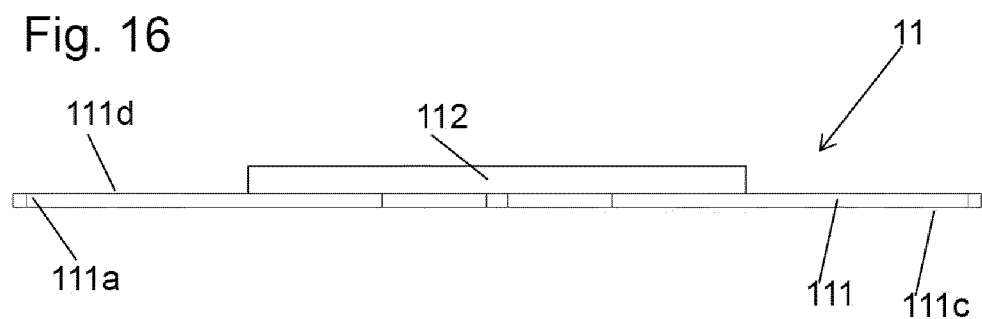
FIG. 16 shows a cross-sectional view of a lens shaping part of an optical device according to the present invention.
Figure 17:
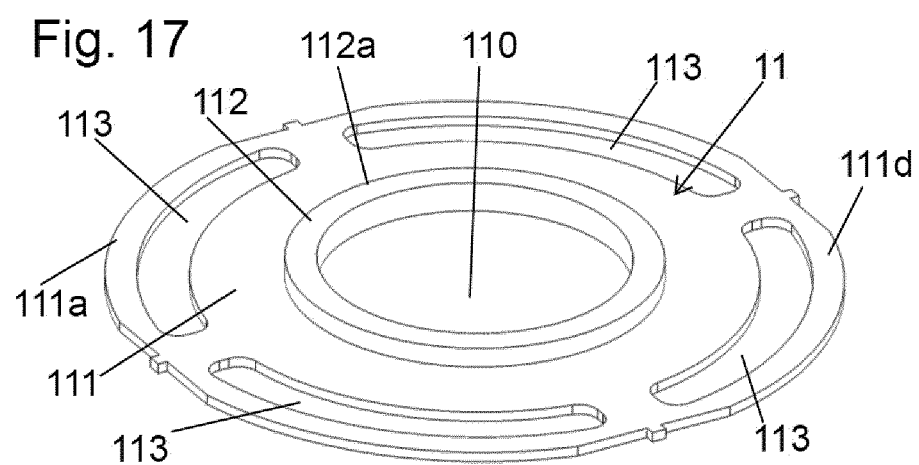
FIG. 17 shows a perspective view of the lens shaping part shown in FIG. 16, which comprises recesses for receiving protrusions from a lens barrel.
Figure 18:
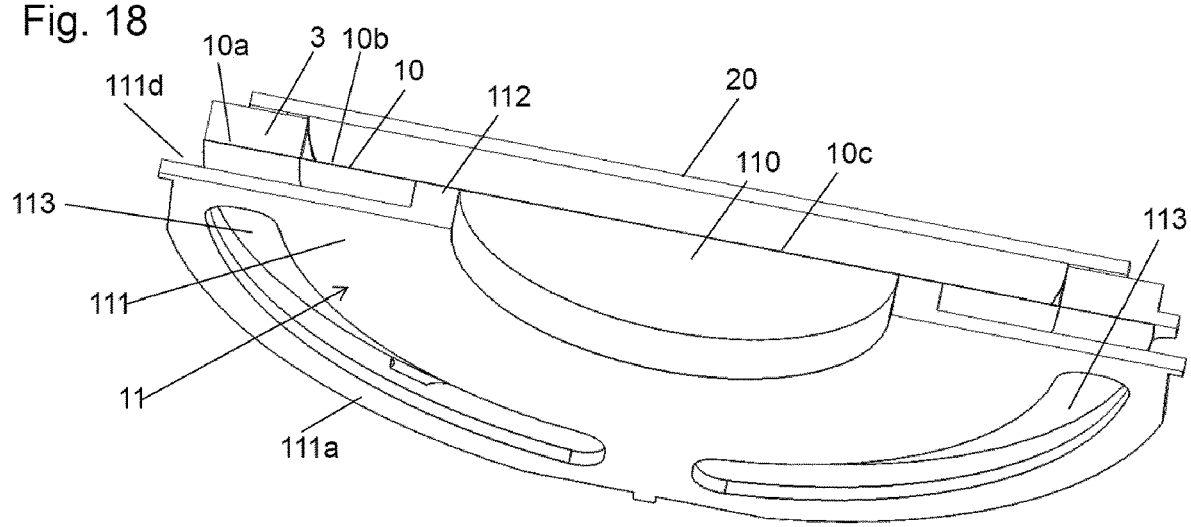
FIG. 18 shows a perspective as well as cross sectional view of the lens shaping part shown in FIGS. 16 and 17.

While in the embodiments of FIGS. 1 to 3, the container 2 is mounted to the motor holder 7 via the top wall 701 of the motor holder 7, FIGS. 4 to 7 show an alternative embodiment, wherein in contrast to FIGS. 1 to 3, although the container 2 is still arranged in an opening 70 of the top wall 701 of the motor holder 7, the container 2 is now not mounted directly to the top wall 701 of the motor holder 7, but to the lens barrel 50. For this, the lens barrel 50 comprises protrusions 52 which protrude from a top side 50a of the lens barrel 50 (the top side 50a surrounds the central opening 50c of the lens barrel 50 in which the at least one rigid lens 51 rests). Each protrusion 52 now extends through a recess 113 formed into the mounting structure 11 of the lens shaping part 11 as shown in FIGS. 16 to 18, i.e., the lens shaping part 11 can be formed as described above, but now comprises said recess 113 in the form of through holes for so that the protrusions 52 can connect to the container 2 while the lens shaping part 11 can still be moved by the movable part 6 of the voice coil motor.

FIG. 7 shows a perspective view of an optical device 1 where the container 2 is mounted to said protrusions 52 and shows how the latter protrude out of the recesses 113 of the lens shaping part 11.

Particularly, the spring structure 8 may comprise per second magnetic structure 41 a first fastening structure 8a that connects to the movable part 6 as well as second fastening structure 8c that connects to the top side 41aa of the respective second magnetic structure 41, wherein the respective first and second fastening structures are connected by a spring arm 8*b* that may comprise a meandering shape, as indicated in FIG. 7. It is to be noted that such a spring structure 8 can also be used in the embodiments shown in FIGS. 1 to 3.

Figure 20:
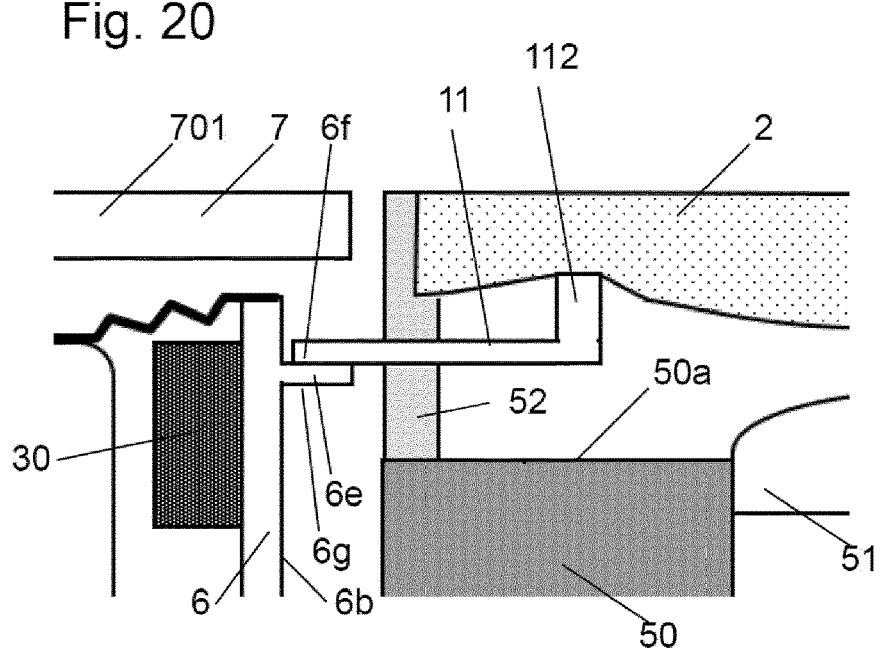
FIGS. 20 to 22 show different details of a connection between a lens shaping part and a movable part of a voice coil motor of an optical device according to the present invention.
Figure 21:
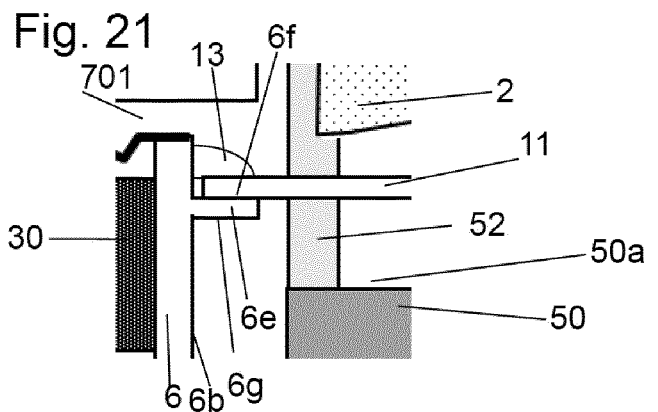
Figure 22:
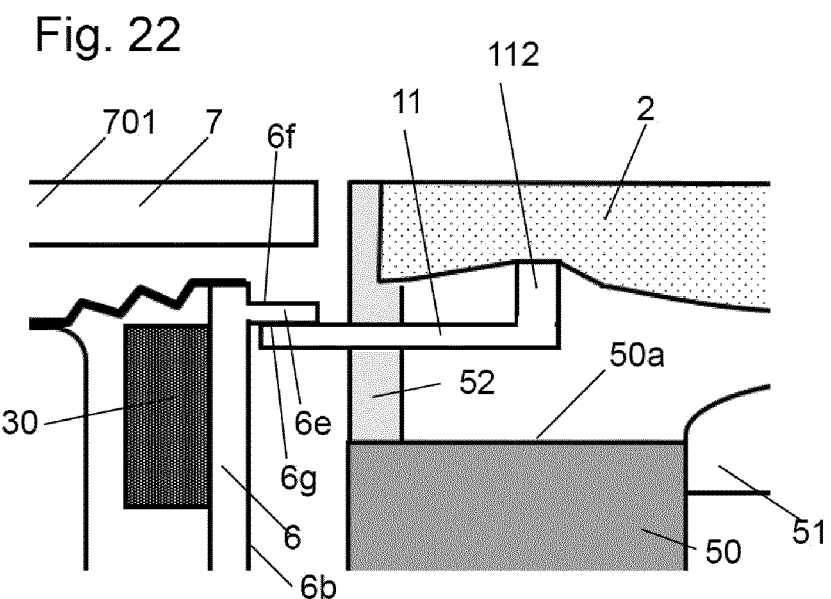

Further, different ways of connecting the lens shaping part 11 to the motor holder concerning the embodiments shown in FIGS. 4 to 7 are schematically indicated in FIGS. 20 to 22 (these features can however also be applied to the embodiments of FIGS. 1 to 3).

According to FIG. 20 an outer edge region 111*a* of the mounting structure 111 is attached to a fastening region 6*e* of the moveable part 6, which fastening region 6*e* protrudes from an inside 6*b* of the movable part 6, which inside 6*b* in turn faces the lens barrel 50. Here, particularly, a bottom side 111*c* of the outer edge region 111*a*/mounting structure 111, which bottom side 111*c* faces the lens barrel 50 and/or the image sensor 9, is bonded to an upper side 6*f* of the fastening region 6*e*, which upper side 6*f* of the fastening region 6*e* faces away from the lens barrel 50.

As further shown in FIG. 21, a glue line 13 can be arranged on a top side 111*d* of the edge region 111*a*/mounting structure 111 and bond the latter to the moveable part 6.

Alternatively, as shown in FIG. 22, a top side 111*d* of the outer edge region 111*a*/mounting structure 111, which top side 111*d* faces away from the lens barrel 50 and/or the image sensor 9, is bonded to a bottom side 6*g* of the fastening region 6*e*, which bottom side 6*g* faces the lens barrel 50.

Figure 8:
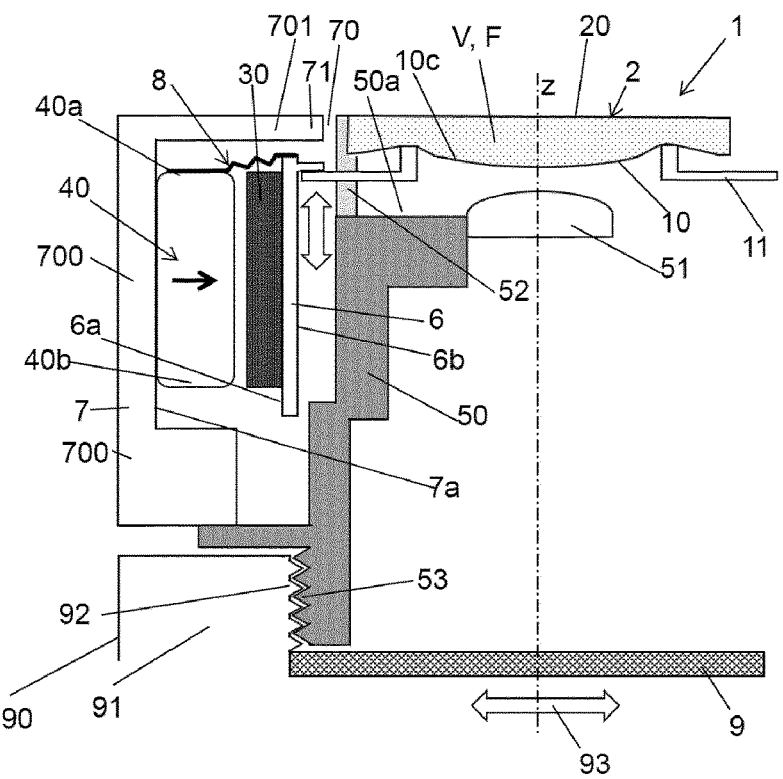
FIG. 8 shows a schematical cross sectional view of another embodiment of an optical device according to the present invention.

While FIGS. 1 to 7 show embodiments of the optical device where OIS can be achieved by tilting the movable part 6 of the voice coil motor 5 accordingly, FIG. 8 shows an embodiment, where the axial movement of the movable part 6 (e.g. for performing AF) is conducted as described above using a circumferential coil 30 and four magnetic structures 40 in form of permanent magnets 40 arranged along the coil 30 so that said magnets 40 face the coil 30 and generate an upward or downward movement of the coil 30/movable part 6/lens shaping part 11 depending on the direction of the current in said coil 30, but OIS is now conducted by moving the image sensor 9 itself with respect to the lens barrel 50 in a plane perpendicular to the axial direction z. Such a movement of the image sensor 9 can be generated using a suitable actuator 93 such as a shape memory alloy motor or another suitable actuator.

Figure 9:
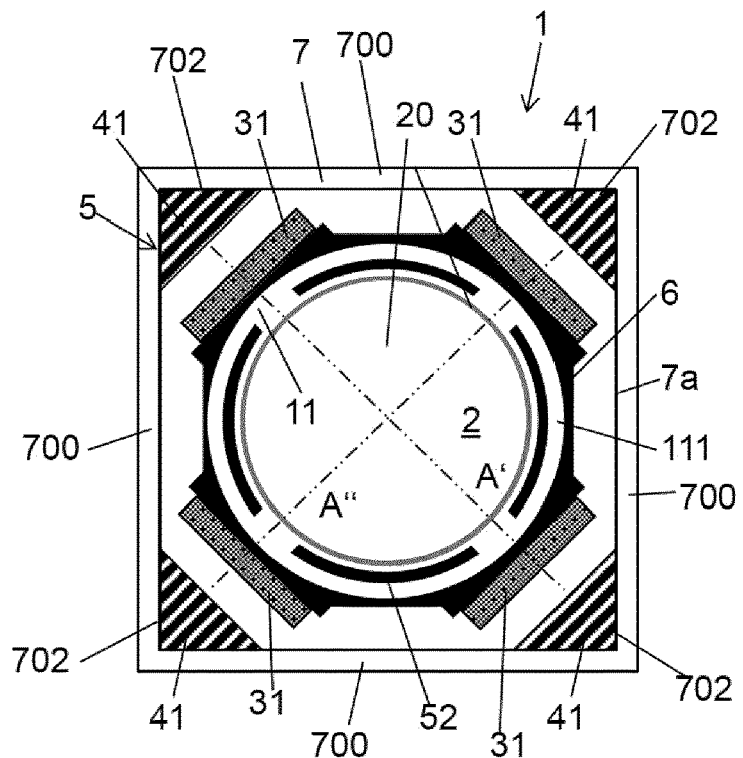
FIGS. 9-13 show schematical top views of arrangements of coils and magnetic structures of optical devices according to the present invention.
Figure 10:
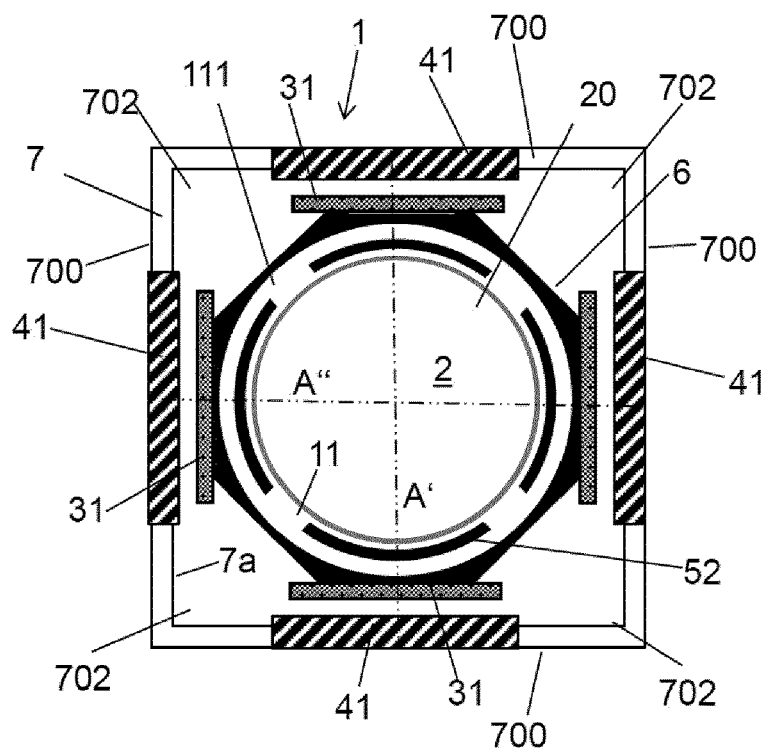

FIGS. 9 and 10 show schematical top views of embodiments of an optical device 1 according to the present invention in order to describe the arrangement of the second magnetic structures 41 used for tilting the movable part 6/lens shaping part 11 in the embodiments shown in FIGS. 1 to 7. It should be noted that the circumferential coil 30 in these embodiments may also be omitted, since the axial (AF) movement of the lens shaping part 11 can also be achieved merely with four second magnetic structures 41 (which are then denoted as magnetic structures 41).

As shown in FIG. 9 the second magnetic structures 41, which may each comprise a lower and an upper magnet 41*a*, 41*b* as shown in FIGS. 1 to 7, are arranged in the corner regions 702 of the motor holder 7, which are respectively formed by two meeting side wall sections 700 of the motor holder. Thus the four second magnetic structures form two pairs of diagonally opposing second magnetic structures 41.

Thus, by actuating diagonally opposing coils 31, the movable part 6/lens shaping part 11 can be tilted about the axis A' and/or about the axis A", which axes A', A" are indicated as dashed lines. This arrangement of magnetic structures 41 (and associated coils 31) is used for the embodiments shown in FIGS. 1 to 7.

However, as shown in FIG. 10 also an alternative arrangement may be used, where each (second) magnetic structure 41 is arranged on a side wall section 700, such that the second magnetic structures 41 again form two pairs of opposing magnetic structures 41. Also here, by actuating opposing coils 31, the movable part 6/lens shaping part 11 can be tilted about axis A' and/or about axis A".

Figure 11:
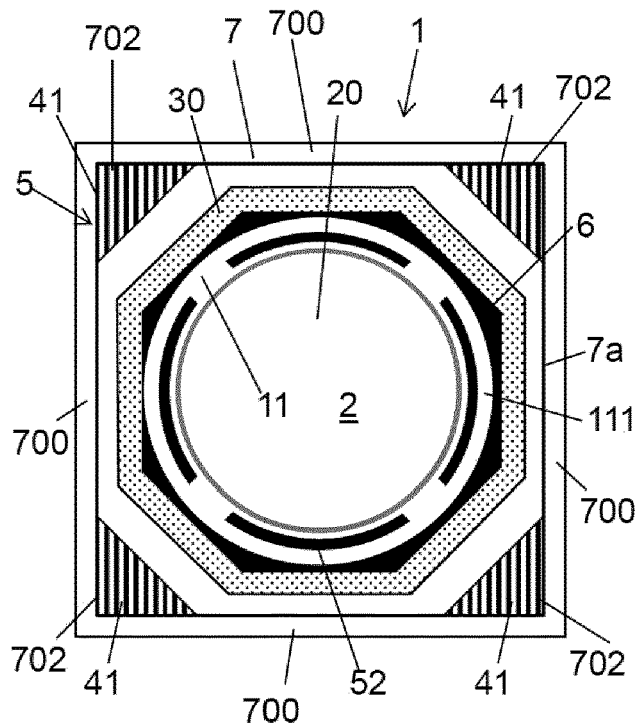

As already indicated above, these arrangements (i.e. FIGS. 9 and 10) can be supplemented by said circumferential first coil 30 for realizing an axial movement of the movable part 6 in the axial direction z as shown in FIGS. 11 to 13. However, an axial movement of the lens shaping part 11 can also be achieved without the first coil 30 by applying a current to all coils shown in FIG. 9 or 10 at the same time in the same direction (e.g. using a four channel driver that delivers a current to all coils 31 independently). Then all forces generated by a coil 31 and an associated magnetic structure 41 point in the same direction (parallel to the axial direction/optical axis z).

FIG. 11 shows the configuration of magnetic structures 41 shown in FIG. 9 in conjunction with a circumferential coil 30. In case the image sensor 9 is laterally moved (see above) instead of a tilting of the lens shaping part 11, the magnetic structures 41 can be single magnets 41 otherwise the magnetic structures may each comprise an upper magnet 41*a* and a lower magnet 41*b*. In the latter case, the magnetic structures 41 can be used together with associated coils 31 to axially move the lens shaping part 11 (AF) and tilt the latter (OIS).

FIG. 12 shows an arrangement of magnetic structures 40 as e.g. in FIG. 7. These magnetic structures 40 are each arranged on a side wall section 700 of the motor holder 7 and may be formed by single permanent magnets 40 respectively. In a plane comprising the axial direction/optical axis z, the magnetization points towards (or alternatively) the axial direction/optical axis z. Particularly, the magnetization extends perpendicular to the axial direction/optical axis z.

In case the image sensor 9 is moved laterally (instead of tilting the lens shaping part 11), no further magnetic structures are needed.

FIG. 13 shows an arrangement of magnetic structures 40, 41 as also shown in FIG. 7. Here, the first magnetic structures 40, which may be single permanent magnets 40 are arranged on the side wall sections 700 of the motor holder, while the second magnetic structures 41 are arranged in the corner regions 702 of the motor holder 7 and may each comprise an upper magnet 41*a* on top of a lower magnet 41*b* as shown in FIGS. 1 to 7.

Figure 14:
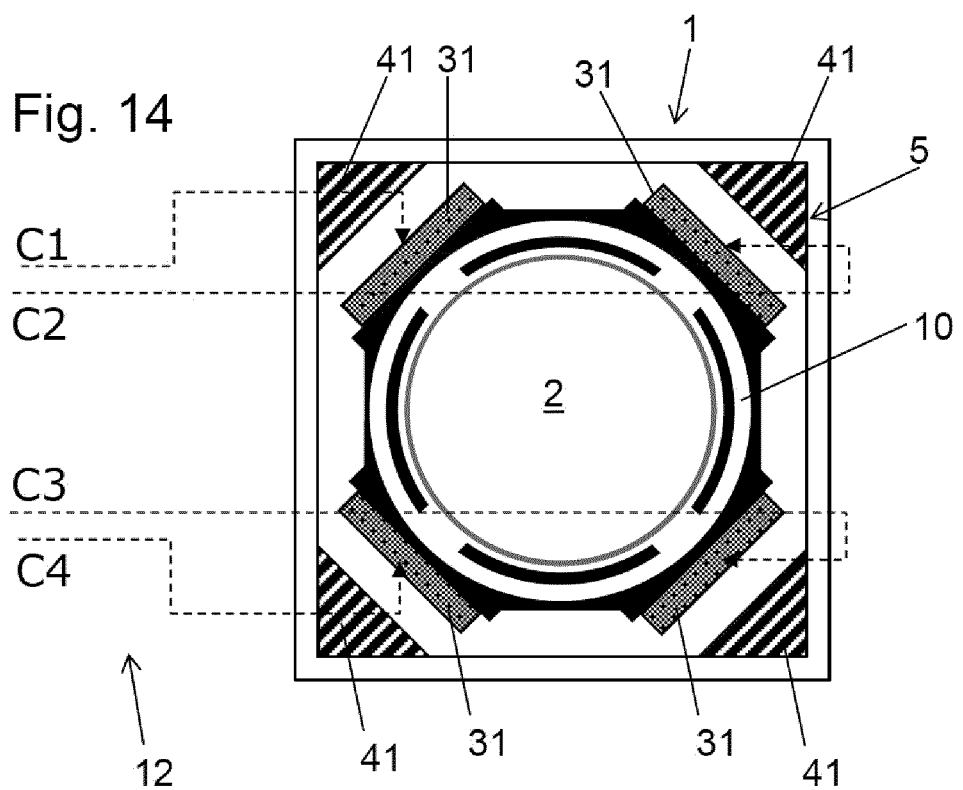
FIGS. 14-15 show a schematical top views of optical devices according to the present invention comprising a driver for controlling electrical currents delivered to the coils, respectively.

FIG. 14 shows a possibility for driving the coils 31 using a driver circuit 12 in case of an optical device 1 having four magnetic structures 41 comprising an upper magnet 41*a* and a lower magnet 41*b*. Each of the magnetic structures 41 faces an associated coil 31 as described in conjunction with FIGS. 1 to 7. By applying a current independently to each coil 31 via an associated channel C1, C2, C3, or C4 of a four channel driver, the coils can be controlled for tilting the movable part 6/lens shaping part 11 (e.g. for OIS) as well as for axially moving the movable part 6/lens shaping part 11 (e.g. for AF).

Figure 15:
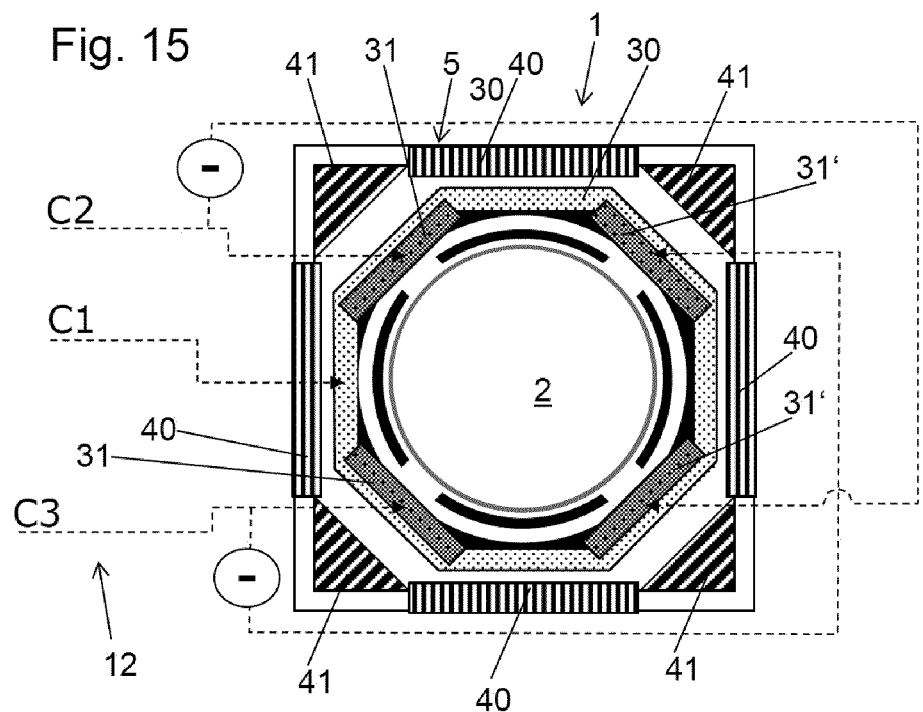

Alternatively, FIG. 15 shows a three channel driver 12 that can be used to control the first coil 30 and the second coils 31 of an optical device corresponding e.g. to the embodiments of FIGS. 1 to 7. Here, said driver 12 comprise a first channel C1 for applying a current to the first coil 30, a second channel C2 for applying currents to two opposing second coils 31, 31', such that the currents delivered to the opposing second coils 31, 31' have the same magnitude but opposite sign, and a third channel C3 for applying currents to two other opposing second coils 31, 31', such that the currents delivered to said other opposing second coils 31, 31' have the same magnitude but opposite sign. This allows one to move the lens shaping part 11 in the axial direction z and to tilt it at the same time.

In order to control the movement of the movable part 6/lens shaping part 11 (i.e. axial movement and/or tilting), a closed-loop control can be employed. A feedback signal for the closed-loop control can be provided by at least two inductive measurement coils 61, 62 as shown in FIGS. 30 to 33.

Figure 30:
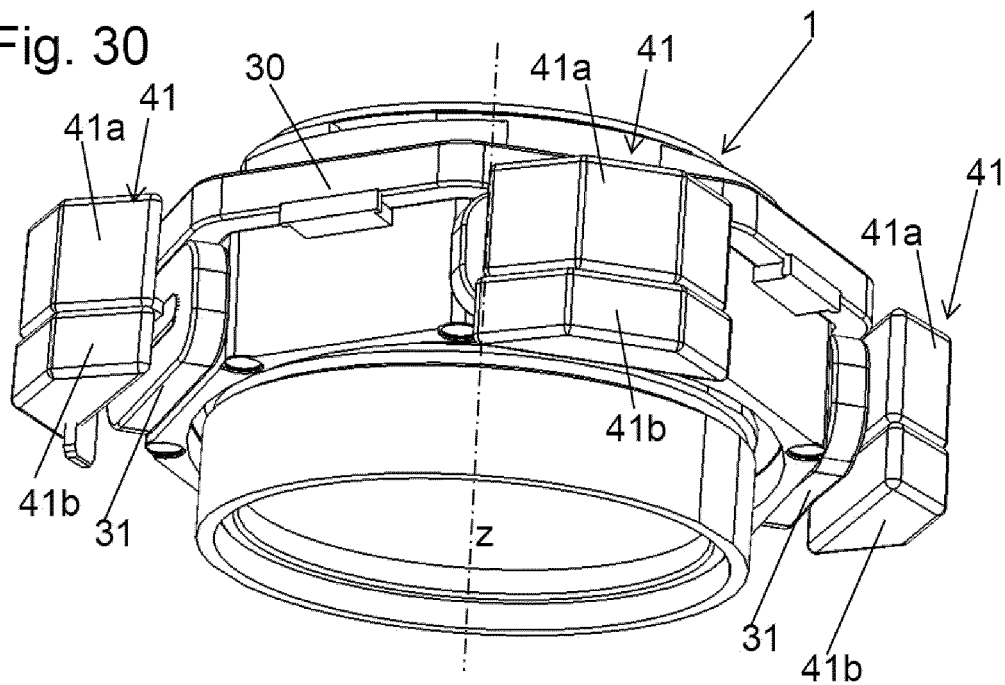
FIGS. 30-33 show different ways of arranging inductive measurement coils with respect to the magnetic structures.
Figure 31:
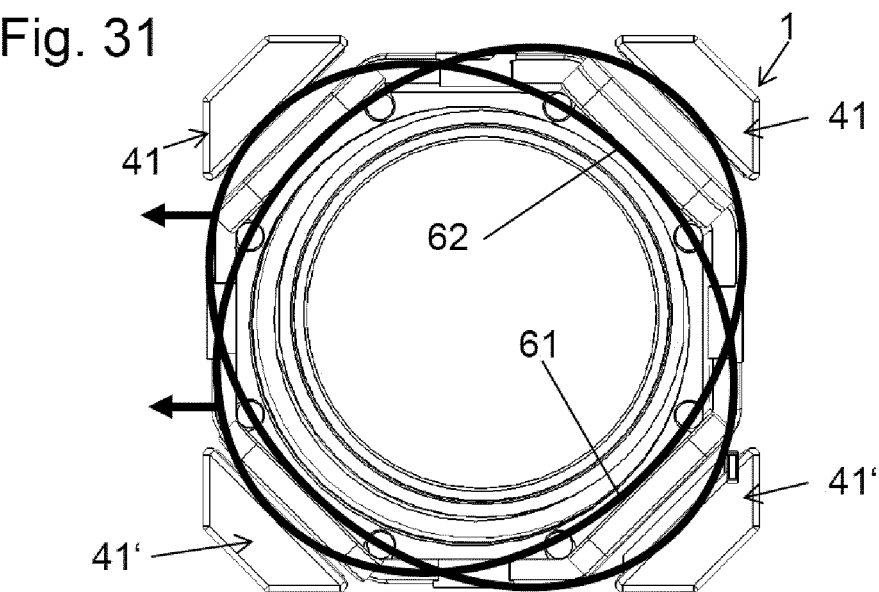

FIG. 30 shows a perspective view of an optical device 1 having a circumferential first coil 30 as described above as well as four (second) magnetic structures 41 comprising an upper and a lower magnet 41a, 41b, which magnetic structures each face a second coil 31. Regarding this configuration of coils 30, 31 and magnetic structures 41, FIGS. 31 to 33 show different possibilities for arranging a first and a second inductive measurement coil 61, 62.

According to FIG. 31 the first inductive measurement coil 61 may extends below two opposing second magnetic structures 41, 41', while the second inductive measurement coil 62 may extend below two other opposing second magnetic structures 41, 41'. Particularly, the inductive measurement coils 61, 62 each extend in a plane that extends perpendicular to the axial direction z. Further, particularly, the measurement coils 61, 62 can be integrated into a flex PCB that extends below the respective opposing second magnetic structures 41, 41'.

Figure 32:
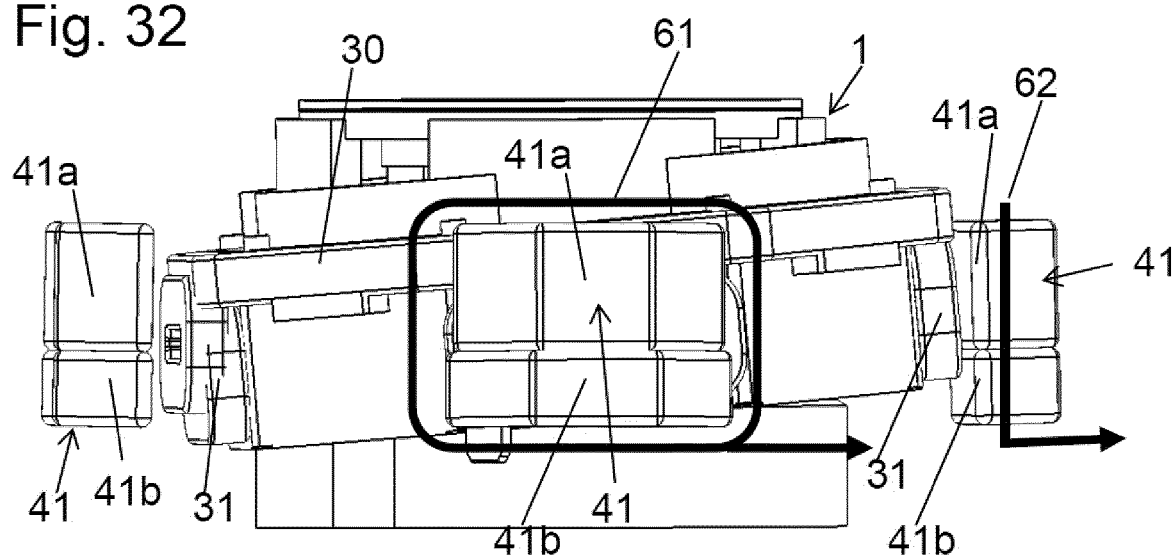
Figure 33:
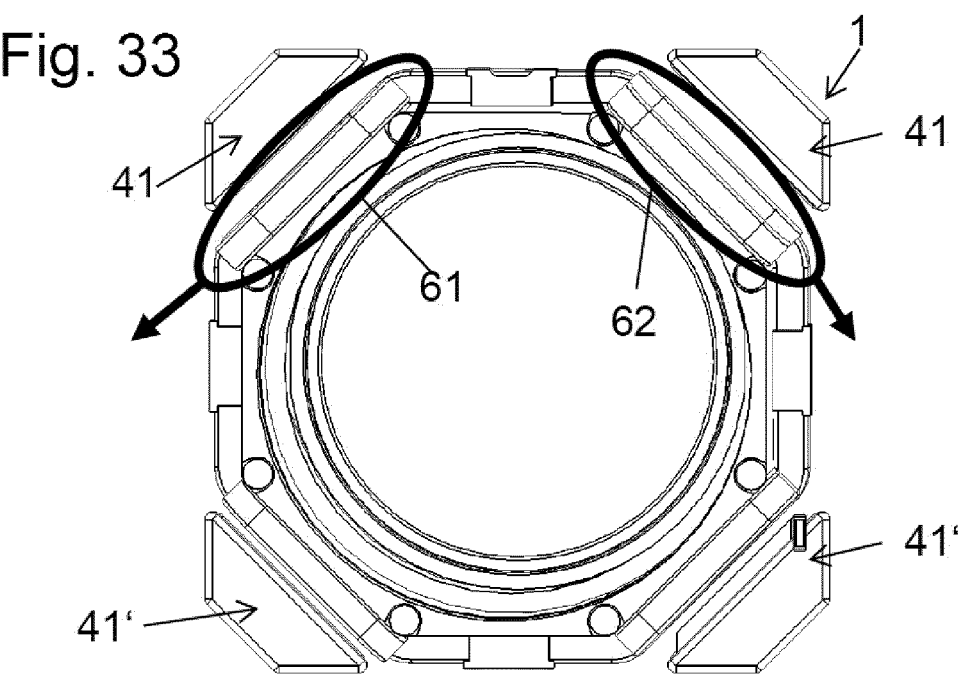

Alternatively, according to FIG. 32, the first and the second inductive measurement coil 61, 62 can each extend around an associated second magnetic structure 41 in a plane that extends parallel to the axial direction z, wherein said second magnetic structures 41 are neighboring second magnetic structures 41 with respect to a peripheral direction of the movable element.

Alternatively, according to FIG. 33, the first inductive measurement coil 61 can extend below a magnetic structure 41, while the second inductive measurement coil 62 coil extends below a neighboring magnetic structure 41. Here, the inductive measurement coils 61, 62 also each extend in a plane that extends perpendicular to the axial direction z. Further, particularly, the inductive measurement coils 61, 62 can be integrated into a flex PCB that extends below the respective second magnetic structure 41.

Figure 36:
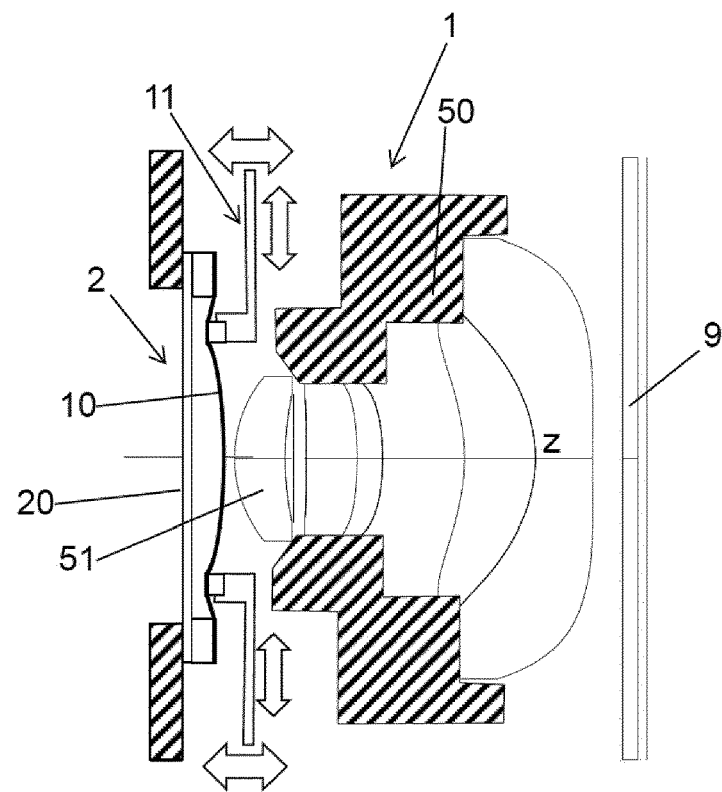
FIGS. 36-37 shows various movements of the lens shaping part upon AF and OIS procedures.
Figure 37:
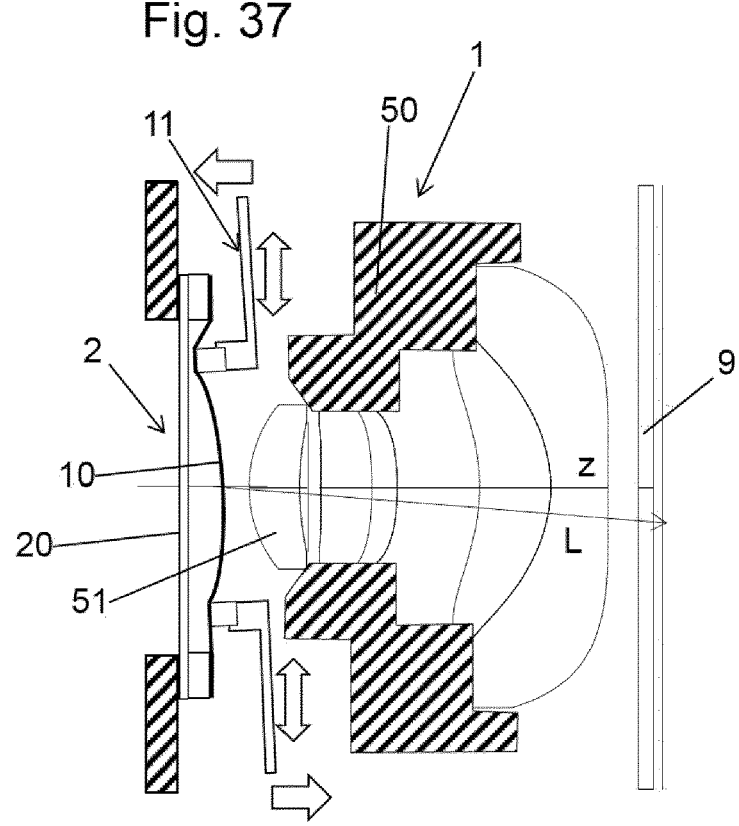

Furthermore, in order to protect the optical device 1, particularly against mechanical shocks, the latter may comprise stops for constraining a movement of the lens shaping part 11. FIG. 36 indicates possible movements of the lens shaping part due to mechanical shock, while FIG. 37 shows the situation in case of a tilting movement of the lens shaping part 11.

Figure 34:
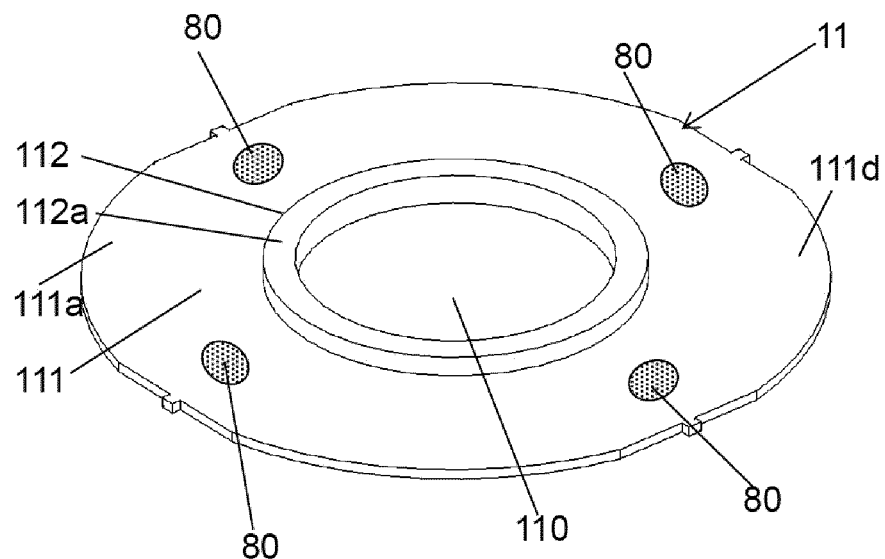
FIGS. 34-35 shows stops arranged on a mounting structure of the lens shaping part for protecting the membrane.
Figure 35:
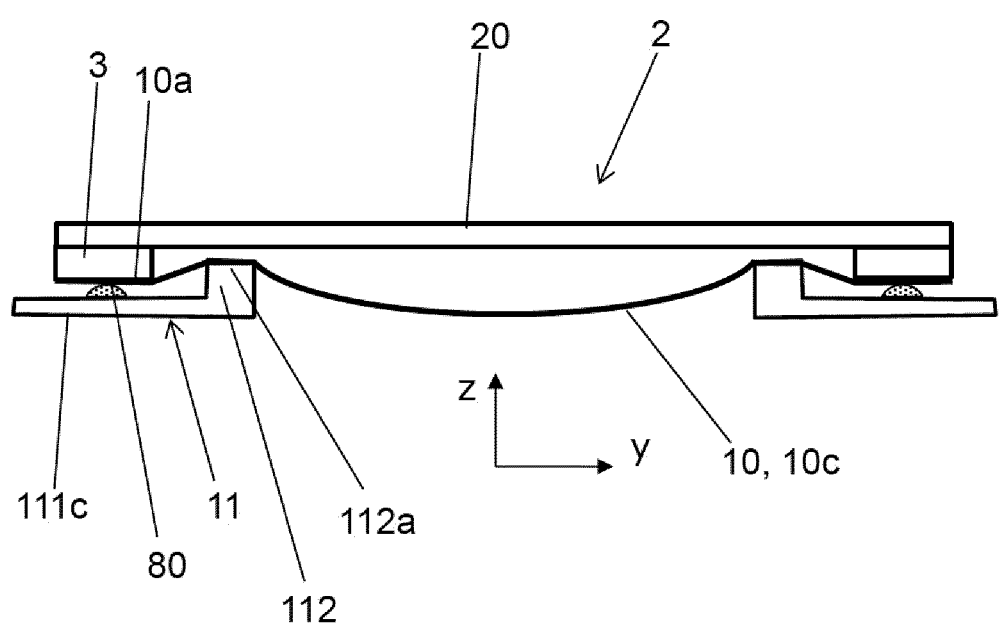

As shown in FIGS. 34 to 35, the membrane 10 comprises a circumferential boundary region 10a connected to a bottom side of the wall member 3, which bottom side faces the lens shaping part 11, wherein a plurality of deformable stops 80 are arranged on a top side 111d of the mounting structure 111 of the lens shaping part 11, so that said boundary region 10a of the membrane 10 can contact said stops 80 when the lens shaping part 11 is moved towards the container 2. This protects the boundary region 10a of the membrane 10 from being squeezed between the wall member 3 and the mounting structure 111 of the lens shaping part 11. Particularly, the deformable stops 80 can be bumps of glue that may be automatically placed by a dispensing system.

Figure 39:
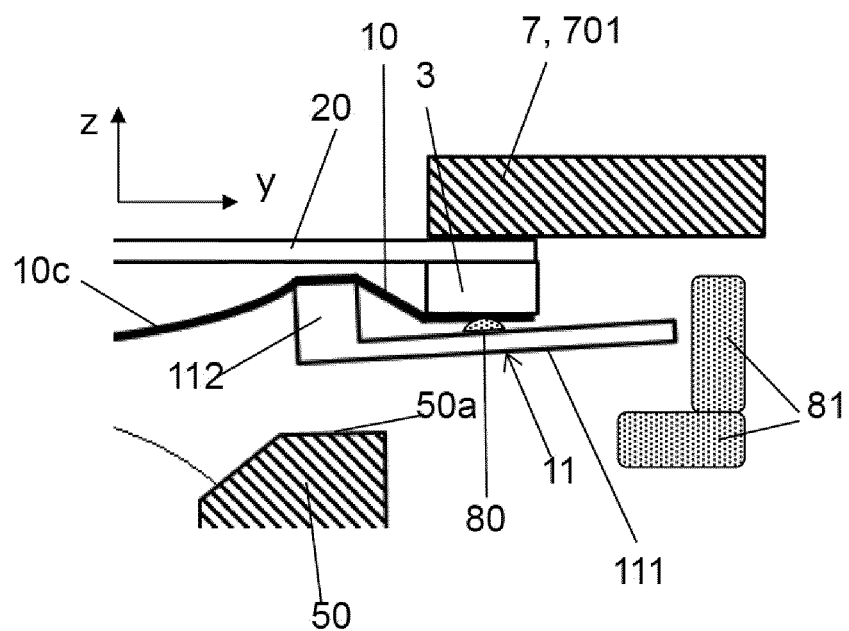
FIG. 39 shows a schematical cross sectional view of a stop of the kind shown in FIGS. 34 to 35 as well as of a further stop for constraining movement of the lens shaping part.

Furthermore, as shown in FIG. 39 said stops 80 can be used in conjunction with further stops 50a, 81 in order to constrain a movement of the lens shaping part 11 along the axial direction z, namely by means of said stops 80 as well as by means of the top side 50a of the lens barrel 50, as well as well as in a plane extending perpendicular to said axial direction z, which is achieved by stops 81 arranged on the periphery of the lens shaping part 11.

Figure 38:
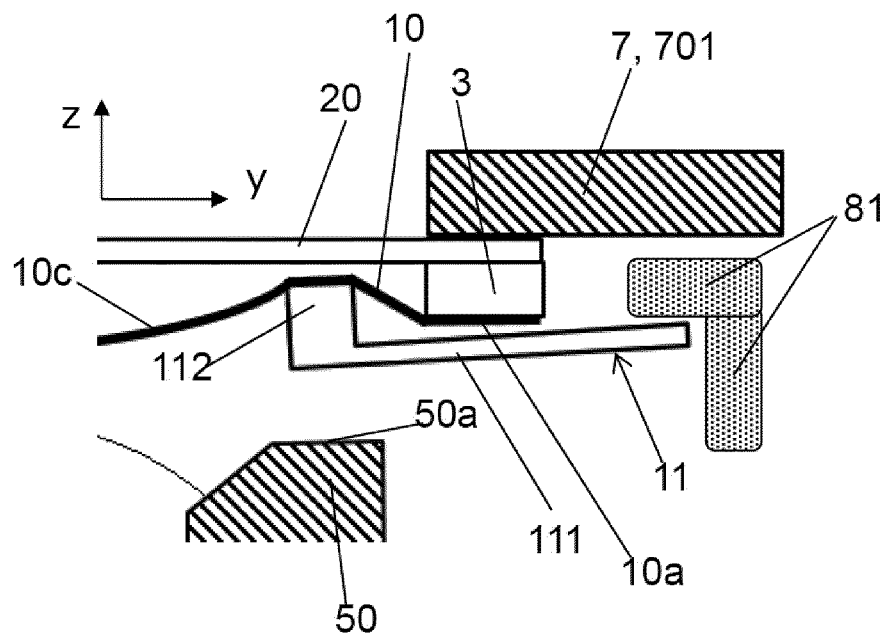
FIG. 38 shows a schematical cross sectional view of a stop for constraining movement of the lens shaping part.

FIG. 38 shows a slightly different design with respect to FIG. 39, wherein here the stops 80 to protect the boundary region 10a of the membrane are omitted and substituted by a stop 81 on the periphery of the lens shaping part 11, which stops 81 are configured to also limit the movement of the lens shaping part in the axial direction z towards the container 2.

Figure 40:
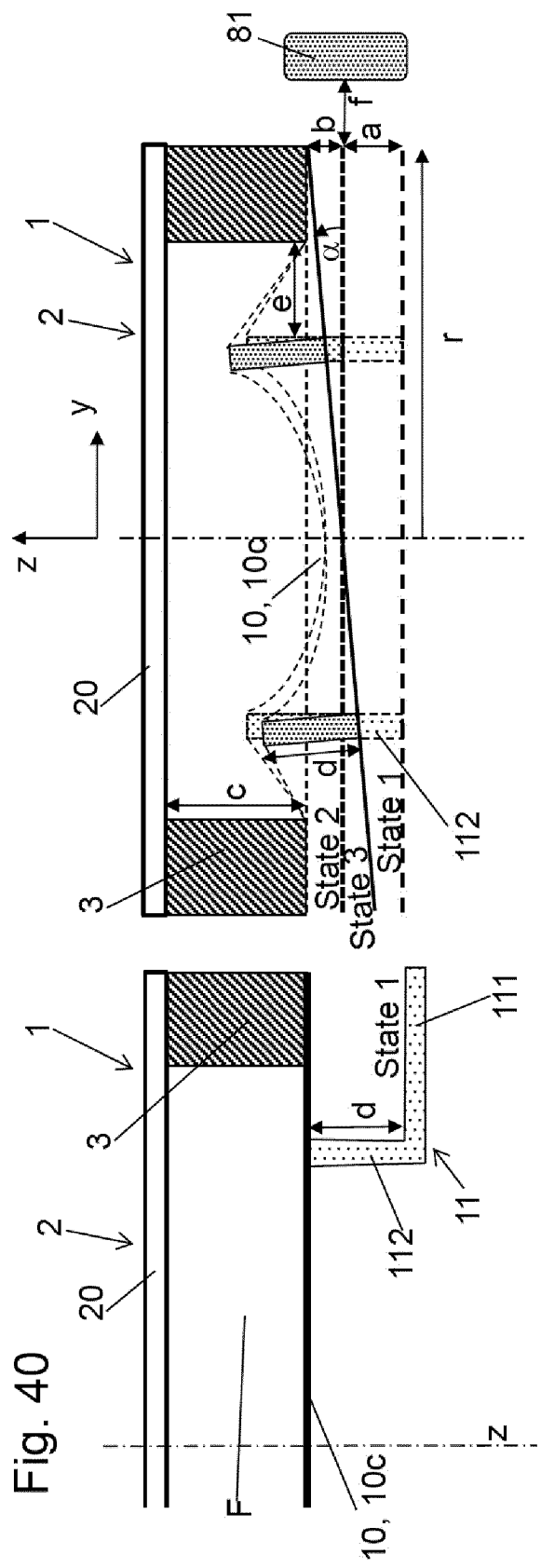
FIG. 40 shows various distances and angles for different states of the lens shaping part.

Furthermore, FIG. 40 indicates different states of the lens shaping part 11 relative to the membrane 10.

Particularly, "state 1" characterizes a neutral state of the lens shaping part 11 (current off), while "state 2" characterizes a state where the lens shaping part is closest to the container and the curvature adjustable area 10c of the membrane 10 is fully bulged out (full auto-focus). Further, "state 3" characterizes a state of maximal tilt a of the lens shaping part 11 as well as full auto-focus.

In this regard, the following parameters are indicated in FIG. 40:

a: Maximum required lens shaper stroke in z-direction for auto-focusing.

In an example of the present invention, one has a=0.08 mm for focusing a fluidic lens with a clear aperture diameter of 3.0 mm to 40 diopters of focal power (25 mm focus distance).

α: Maximum mechanical tilt angle about x or y for optical image stabilization (at maximum auto-focus).

In an example of the present invention, one has a=3 degrees for compensating, i.e. correcting 1 degree of motion (OIS).

b: Maximum stroke in z-direction resulting from maximum image stabilization tilt angle.

c: Height of container 2.

In an example of the present invention, c is in the range from 0.25 mm to 0.30 mm for a fluidic lens with a clear aperture diameter of 3.0 mm that can focus to 40 diopters of focal power (25 mm focus distance).

d: Height of lens shaping part 11.

In an example of the present invention, c=0.20 mm for a liquid lens with a clear aperture diameter of 3.0 mm that can focus to 40 diopters of focal power (25 mm focus distance).

e: radial clearance between lens shaping ring 112 outer radius and container inner radius.

f: radial clearance between mounting structure 111 outer radius and mechanical stop 81 in x and y direction.

r: Container outer radius.

In an example of the present invention, r is between 6 mm and 9.5 mm for a fluidic lens with a clear aperture diameter of 3.0 mm that can focus to 40 diopters of focal power (25 mm focus distance).

Particularly, the optical device 1 preferably obeys the following relations concerning the above quantities:

d is smaller than c;
b is equal to $r*\tan(a)$;
a+b is smaller than d;
f is smaller than e.

Figure 41:
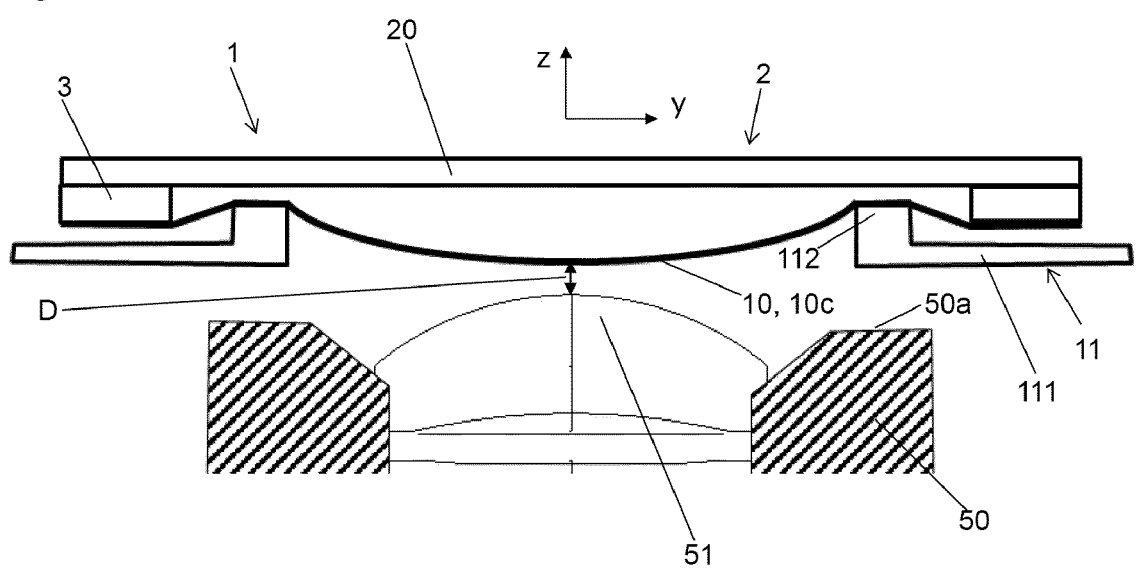
FIG. 41 shows a minimal clearance between a first lens of the lens barrel and the fully curved membrane.

Finally, FIG. 41 shows the membrane 10 of an optical device 1 according to the present invention in a fully deflected state in which the curvature-adjustable area 10c is maximally bulged towards the at least one rigid lens 51 of the lens barrel 50, which forms a first rigid lens 51 of the lens barrel 50 (i.e., a topmost lens 51 of the lens barrel 50 that is closest to the container 2), wherein the container 2 is preferably arranged such with respect to the lens barrel 50 that a pre-defined safety clearance D is provided between the curvature-adjustable area 10c of the membrane 10 and the first rigid lens 51 in the axial direction z.

The invention claimed is:

1. Optical device, comprising:
    a container forming a fluidic lens, the container comprising a transparent and elastically expandable membrane, a transparent optical element facing the membrane, and a wall member, wherein the optical element and the membrane are connected to the wall member, and wherein said container encloses a volume (V) that is filled with a fluid (F),
    a lens shaping part that is in contact with said membrane for defining a curvature adjustable area of the membrane, which area faces said optical element,
    a circumferential lens barrel extending in an axial direction (z), which lens barrel surrounds an opening in which at least one rigid lens is arranged that is held by the lens barrel, and
    a voice coil motor that is designed to move the lens shaping part along an axial direction (z) with respect to said container, so as to adjust a curvature of said area and therewith a focal length of the fluidic lens, wherein the voice coil motor comprises at least one coil arranged on a movable part and a plurality of magnetic structures arranged on a motor holder, wherein said movable part is movably mounted to the motor holder via a spring structure so that it can be moved along said axial direction (z), and wherein the lens shaping part is mounted to said movable part,
    for measuring the spatial position of the movable part, the optical device comprises at least a first and a second inductive measurement coil, and
    the first inductive measurement coil extends below two opposing second magnetic structures, while the second inductive measurement coil extends below two other opposing second magnetic structures, or
    the first inductive measurement coil extends below two opposing magnetic structures, while the second inductive measurement coil extends below two other opposing magnetic structures.

2. Optical device according to claim 1, characterized in that the circumferential lens barrel comprises protrusions protruding from a top side of the circumferential lens barrel, wherein the container is attached to said protrusions, and wherein the respective protrusion extends through an associated recess of the lens shaping part, the motor holder comprises four side wall sections connected to each other to form a circumferential side wall, wherein each two adjacent side wall sections meet and form a corner region on an inside of the motor holder, and the at least one coil is a circumferential first coil that is attached to the movable part and extends around the movable part.

3. Optical device according to claim 2, characterized in that said plurality of magnetic structures comprises four first magnetic structures attached to the motor holder and arranged along the circumferential first coil so that the four first magnetic structures face the circumferential first coil, wherein each of the four first magnetic structures is arranged in an associated corner region, or that each of the four first magnetic structures is arranged on an inside of an associated side wall section.

4. Optical device according to claim 3, characterized in that said plurality of magnetic structures comprises four second magnetic structures attached to the motor holder and arranged along the circumferential first coil so that the four second magnetic structures face the circumferential first coil.

5. Optical device according to claim 4, characterized in that that each first magnetic structure is arranged on an inside of the associated side wall section while each second magnetic structure is arranged in the associated corner region.

6. Optical device according to claim 1, characterized in that the voice coil motor comprises four second coils, which second coils are arranged below a first coil on a lower section (6d) of the moveable part, which lower section is connected to said upper section.

7. Optical device according to claim 6, characterized in that said four second magnetic structures each comprises an upper magnet and a lower magnet, wherein the upper magnet is arranged on top of the lower magnet, wherein each upper magnet faces an upper section of an associated second coil, and wherein each lower magnet faces a lower section of an associated second coil.

8. Optical device according to claim 1, characterized in that that said at least one coil is one of four coils comprised by the voice coil motor, which four coils are arranged on the movable part.

9. Optical device according to claim 8, characterized in that said plurality of magnetic structures is formed by four magnetic structures, wherein each of these magnetic structures is arranged on the motor holder, and wherein each of said four magnetic structures comprises an upper magnet and a lower magnet, wherein the upper magnet is arranged on top of the lower magnet, wherein each upper magnet faces an upper section of an associated coil, and wherein each lower magnet faces a lower section of an associated coil.

10. Optical device according to claim 1, characterized in that the optical device is designed to tilt the movable part and therewith the lens shaping part with respect to said axial direction (z), particularly so as to form the container into a prism for deflecting light passing through the container.

11. Optical device according to claim 6, characterized in that the optical device comprises a driver circuit for controlling currents applied to said first coil and said second coils, wherein said driver comprise a first channel (C1) for applying a current to the first coil, a second channel (C2) for applying currents to two opposing second coils, such that the currents delivered to the opposing second coils have the same magnitude but opposite sign, and a third channel (C3) for applying currents to two other opposing second coils, such that the currents delivered to said other opposing second coils have the same magnitude but opposite sign.

12. Optical device according to claim 1, characterized in that the wall member comprises one of: circular periphery (U), hexagonal periphery(U).

13. Optical device according to claim 1, characterized in that the first and the second inductive measurement coil each extend around an associated second magnetic structure, wherein each second magnetic structure is a neighboring second magnetic structure.

14. Optical device according to claim 1, characterized in that the first and the second inductive measurement coil each extend around an associated magnetic structure, wherein each magnetic structure is a neighboring magnetic structure.

15. Optical device according to claim 1, characterized in that the first inductive measurement coil extends below a second magnetic structure, while the second inductive measurement coil extends below a neighboring second magnetic structure.

16. Optical device according to claim 1, characterized in that the first inductive measurement coil extends below a magnetic structure, while the second inductive measurement coil extends below a neighboring magnetic structure.

17. Optical device according to claim 1, characterized in that the optical device comprises a plurality of stops for constraining a movement of the lens shaping part and/or of the movable part along the axial direction z as well as in a plane extending perpendicular to said axial direction (z).

* * * * *